United States Patent
Watanabe et al.

(10) Patent No.: US 7,447,126 B2
(45) Date of Patent: Nov. 4, 2008

(54) RECORDING DEVICE, AND RELATED CONTROL METHOD, COMPUTER PROGRAM AND SYSTEM LSI

(75) Inventors: Akihiro Watanabe, Higashihiroshima (JP); Shuji Okamoto, Kure (JP); Masako Ninomiya, Hiroshima (JP); Youichi Yamamoto, Hiroshima (JP)

(73) Assignee: Matsushita Electrical Industrial Co., Ltd., Osaka (JP)

( * ) Notice: Subject to any disclaimer, the term of this patent is extended or adjusted under 35 U.S.C. 154(b) by 422 days.

(21) Appl. No.: 10/556,061

(22) PCT Filed: May 12, 2004

(86) PCT No.: PCT/JP2004/006693

§ 371 (c)(1),
(2), (4) Date: Nov. 8, 2005

(87) PCT Pub. No.: WO2004/100147

PCT Pub. Date: Nov. 18, 2004

(65) Prior Publication Data

US 2007/0070828 A1 Mar. 29, 2007

(30) Foreign Application Priority Data

May 12, 2003 (JP) .............................. 2003-133826

(51) Int. Cl.
*G11B 5/09* (2006.01)

(52) U.S. Cl. .................... 369/47.12; 369/47.13; 369/84

(58) Field of Classification Search ....................... None
See application file for complete search history.

(56) References Cited

U.S. PATENT DOCUMENTS

| 7,158,713 | B2 * | 1/2007 | Goto et al. ..................... 386/69 |
| 2001/0033736 | A1 * | 10/2001 | Yap et al. ...................... 386/46 |
| 2002/0071351 | A1 | 6/2002 | Hamada et al. |
| 2002/0076195 | A1 | 6/2002 | Nakajima et al. |
| 2002/0109930 | A1 | 8/2002 | Saito et al. |
| 2002/0126986 | A1 | 9/2002 | Lim et al. |
| 2004/0013058 | A1 | 1/2004 | Kudo |
| 2005/0123276 | A1 * | 6/2005 | Sugaya ......................... 360/60 |

FOREIGN PATENT DOCUMENTS

| EP | 1 001 622 | 5/2000 |
| EP | 1 173 016 | 1/2002 |
| JP | 2000-152157 | 5/2000 |
| JP | 2000-195232 | 7/2000 |
| WO | 02/065468 | 8/2002 |

* cited by examiner

Primary Examiner—Muhammad N. Edun
(74) Attorney, Agent, or Firm—Wenderoth, Lind & Ponack L.L.P.

(57) ABSTRACT

A recording device executes unattended recording after suspending dubbing when a preset recording time draws near during the dubbing, and saves dubbing-status information showing the suspension position of the dubbing. The recording device reads the dubbing status information after the end of the unattended recording, and resumes the dubbing from the suspension position. If suspension/resumption during the dubbing of a single source content results in a plurality of duplicate contents, the recording device edits the duplicate contents into a single content or a single playback route.

18 Claims, 29 Drawing Sheets

FIG.4

| PRST# | DATE | START | END | CH. | QUAL. | REC. TO |
|---|---|---|---|---|---|---|
| 1 | 3/14 | 21:00 | 23:00 | 1 | XP | HDD |
| 2 | 3/15 | 9:00 | 12:00 | 5 | EP | DVD |

FIG.5A

| DUB.# | SOURCE ID | QUAL. |
|---|---|---|
| 1 | 101 | EP |
| 2 | 102 | EP |
| | | |

FIG.5B

| DUB.# | SOURCE ID | QUAL. | PRIORITY INFO. |
|---|---|---|---|
| 1 | 101 | EP | NO |
| 2 | 102 | EP | YES |
| | | | |

FIG.6A

| SOURCE ID |
|---|
| DUB. QUAL. |
| SUSP. REASON |
| SUSP. POSITION |
| DUPLICATE NO. |
| DUPLICATE ID 1 |
| DUPLICATE ID 2 |
| ⋮ |
| DUPLICATE ID n |

FIG.6B

| 101 |
|---|
| EP |
| UNATTENDED REC. |
| 00 : 25 : 26 . 27 |
| 2 |
| 201 |
| 203 |

FIG.12A

| No | CONT. NAME | REC. TIME | QUAL. | PROTECT |
|---|---|---|---|---|
| | PROGRAM LIST SCREEN | | | DVD |
| 1 | DUP. CONT. A | 1 HR 00 MIN | LP | NO |
| 2 | DUP. CONT. B | 1 HR 00 MIN | LP | NO |
| — | — | — | — | — |
| — | — | — | — | — |
| — | — | — | — | — |

CURRENT TIME 3/18 19:00

FIG.12B

| No | CONT. NAME | REC. TIME | QUAL. | PROTECT |
|---|---|---|---|---|
| | PROGRAM LIST SCREEN | | | HDD |
| 1 | SOURCE CONT. | 2 HR 00 MIN | XP | NO |
| 2 | UNATT. REC. CONT. | 1 HR 00 MIN | SP | NO |
| — | — | — | — | — |
| — | — | — | — | — |
| — | — | — | — | — |

CURRENT TIME 3/18 19:00

FIG.14A

| PL-ROUTE NO.(N) | |
|---|---|
| PL-ROUTE ID 1 | PL-INTERVAL NO. 1(P) |

| PL. INTERVAL | CONTENT ID 1 | PL-START POSIT. 1 | PL-END POSIT.1 |
|---|---|---|---|
| | ⋮ | ⋮ | ⋮ |
| | CONTENT ID p | PL-START POSIT. p | PL-END POSIT. P |

| PL-ROUTE ID 2 | PL-INTERVAL NO. 2(q) |
|---|---|

| PL. INTERVAL | CONTENT ID 1 | PL-START POSIT. 1 | PL-END POSIT.1 |
|---|---|---|---|
| | ⋮ | ⋮ | ⋮ |
| | CONTENT ID q | PL-START POSIT. q | PL-END POSIT.q |

| PL-ROUTE ID n | PL-INTERVAL NO. n(r) |
|---|---|

| PL. INTERVAL | CONTENT ID 1 | PL-START POSIT. 1 | PL-END POSIT.1 |
|---|---|---|---|
| | ⋮ | ⋮ | ⋮ |
| | CONTENT ID r | PL-START POSIT. r | PL-END POSIT.r |

FIG.14B

| 2 | |
|---|---|
| 1001 | 1 |
| 201 | 00:00:00.00 | 00:25:26.27 |
| 1002 | 1 |
| 203 | 00:00:00.00 | 00:34:35.36 |

FIG.14C

| 1 | |
|---|---|
| 1003 | 2 |
| 201 | 00:00:00.00 | 00:25:26.27 |
| 203 | 00:00:00.00 | 00:34:35.36 |

FIG.18A

| PLAYLIST SCREEN | | | | DVD |
|---|---|---|---|---|
| No | CREATED ON | CONT. NAME | PL. TIME | SCENE NO. |
| 1 | 3/18 | DUP. CONT. | 2 HR 00 MIN | 2 |
| — | — | — | — | — |
| — | — | — | — | — |
| — | — | — | — | — |
| — | — | — | — | — |

CURRENT TIME 3/18 19:00

FIG.18B

| PROGRAM LIST SCREEN | | | | DVD |
|---|---|---|---|---|
| No | CONT. NAME | REC. TIME | QUAL. | PROTECT |
| 1 | DUP. CONT. | 2 HR 00 MIN | EP | NO |
| — | — | — | — | — |
| — | — | — | — | — |
| — | — | — | — | — |
| — | — | — | — | — |

CURRENT TIME 3/18 19:00

① DUBBING START

③ DELETE ② TERMINATE DUBBING

④ UNATTENDED REC. START

⑥ RESTART DUBBING    ⑤ UNATTENDED REC. END

⑦ DUBBING END

① DUBBING START

③ DELETE ② TERMINATE DUBBING

④ UNATTENDED REC. START

⑤ UNATTENDED ⑥ RESTART DUBBING
REC. END

⑦ DUBBING END

FIG.28A

| UNATT-REC SETTING SCREEN | | | | | | | |
|---|---|---|---|---|---|---|---|
| No | DATE | START | END | Ch | NAME | QUAL. | REC. TO |
| 1 | 3/14 | 21:00 | 23:00 | 1 | MOVIE | XP | HDD |
| 2 | 3/15 | 9:00 | 12:00 | 5 | MAJOR LEAGUE | EP | DVD |
| – | – | – | – | – | – | – | – |
| – | – | – | – | – | – | – | – |
| – | – | – | – | – | – | – | – |

CURRENT TIME 3/14 18:00  [ENTER]  [CANCEL]

FIG.28B

| DUBBING SETTING SCREEN | | | | | | |
|---|---|---|---|---|---|---|
| No | CONT. NAME | REC. TIME | SOURCE QUAL. | DUB. QUAL. | DUB. DEST. | PRIORITY |
| 1 | DRAMA | 1HR 00MIN | XP | EP | DVD | YES |
| 2 | ENGLISH | 0HR 30MIN | SP | EP | DVD | YES |
| 3 | SOCCER | 2HR 00MIN | SP | EP | DVD | YES |
| – | – | – | – | – | – | – |
| – | – | – | – | – | – | – |

CURRENT TIME 3/14 20:30  [ENTER]  [CANCEL]

FIG.28C

CHANGE RECORDING DESTINATION OF
UNATTENDED RECORDING

[OKAY]  [CANCEL]

RECORDING DEVICE, AND RELATED CONTROL METHOD, COMPUTER PROGRAM AND SYSTEM LSI

TECHNICAL FIELD

The present invention relates to a recording device that functions to dub contents recorded on one recording medium to another recording medium, and to perform unattended recording of broadcast contents.

BACKGROUND ART

While there are recording devices that use various types of recording media, integrated recorders that incorporate the functions of both digital versatile disk (DVD) and hard disk (HD) recorders have flooded the market in recent years.

Integrated recorders are able to record contents onto both HD and DVD, although, generally, large-capacity HDs over 100 GB (gigabytes) are used to facilitate the temporary storage of large numbers of contents acquired from television broadcasts, while interchangeable DVDs are used for long-term storage of contents. For this reason, a common mode of usage is for contents selected by the user from those temporarily stored on HD to be duplicated (hereinafter referred to as "dubbing") from HD to DVD.

Dubbing methods include re-encoding, which involves changing both the allotted bitrate and encoding method of content video streams at the time of dubbing, and high-speed dubbing, which involves copying contents as they are, as files in the file system of the recording medium. However, even with the high-speed dubbing, which takes less time than re-encoding, approximately 1 hour is needed to dub a single DVD worth (4.7 GB) of contents. Speeding up the DVD drive device helps to shorten this processing time, although since AV devices and other integrated recorders for consumer use are also required to be low noise, dubbing speeds achievable using this method currently remain at around three times normal speed. Around 30 minutes processing time (including verification, etc) is needed to dub a single DVD worth of contents at three times normal speed.

Since the processing time required in the dubbing corresponds to the volume of the content being dubbed, the broadcast start-time of contents for unattended recording sometimes arrives while dubbing is still being performed. Because recording devices generally prioritize dubbing so that unattended recording is not executed while dubbing is being performed, contents that the user wanted to record get overlooked if preset recording times arrive during dubbing operations.

In view of this, an approach that prioritizes unattended recording can be adopted to discontinue the dubbing when a preset recording time arrives. However, part of the source content is omitted (i.e. not dubbed) when unattended recording is prioritized, making this approach unsatisfactory for the long-term storage originally intended.

DISCLOSURE OF THE INVENTION

The present invention aim to provide a recording device, and a related method, computer program and system LSI that are capable of properly recording both contents for dubbing and broadcast contents for unattended recording, in the case of a preset recording time arriving while dubbing is being performed.

To achieve the above object, a recording device pertaining to the present invention includes: a dubbing unit operable to execute dubbing in which a source content is read from a first recording medium and a duplicate of the source content is recorded on a second recording medium; an unattended-recording unit operable to execute unattended recording in which a content preset for recording is acquired from a broadcast signal and recorded to a designated recording destination, being one of the first and second recording media; and a control unit operable to cause the dubbing unit to (i) suspend the dubbing prior to the start of the unattended recording if the dubbing is being executed, and (ii) resume the dubbing after the end of the unattended recording if the dubbing has been suspended.

According to this configuration, when a preset recording time arrives while dubbing is being performed, it is possible to execute the unattended recording after suspending the dubbing, and to resume the dubbing after the end of the unattended recording.

Consequently, contents can be properly recorded using both dubbing and unattended-recording procedures.

Here, the recording device may further include a holding unit operable to hold dubbing information for use in the dubbing resumption. Also, the control unit may include a suspension subunit operable to cause the dubbing suspension and to save dubbing information to the holding unit, and a resumption subunit operable, if dubbing information is held by the holding unit at the end of the unattended recording, to cause the dubbing resumption based on the held dubbing information.

Furthermore, the dubbing information may include source ID information uniquely identifying the source content, and position information showing the suspension position of the reading, and the dubbing unit may read the source content identified by the source ID information from the suspension position shown by the position information if the dubbing is resumed.

These configurations enable source contents to be dubbed from the position at which the dubbing was suspended when the dubbing is resumed. Consequently, source content can be properly dubbed without omissions.

Here, the dubbing information may further include reason information showing the reason for the dubbing suspension, and the resumption subunit may resume the dubbing only if the reason information shows that the dubbing suspension resulted from the start of the unattended recording.

According to this configuration, the dubbing is not resumed by mistake when the suspension was for reasons such as the insufficient recording capacity of the second recording medium.

Here, the recording device may further include an editing unit operable to edit a plurality of duplicate contents resulting from the dubbing suspension into a state in which contiguous viewing is possible.

Even if a plurality of duplicate contents are recorded in noncontiguous areas of the second recording medium as a result of the dubbing being suspended/resumed, this configuration enables the duplicate contents to be viewed contiguously, the same as the source content.

Here, the dubbing information may further include first duplicate ID information uniquely identifying a first duplicate content recorded prior to the dubbing suspension, the dubbing unit may save second duplicate ID information uniquely identifying a second duplicate content recorded after the dubbing resumption to the holding unit, and the editing unit edits the duplicate contents identified by the first and second duplicate ID information into a state in which contiguous viewing is possible.

This configuration enables a plurality of duplicate contents resulting from the suspension/resumption of dubbing to be identified, and for these duplicate contents to be edited into a form that allows them to be viewed contiguously.

Consequently, duplicate contents generated by the dubbing of a source content can be viewed without any omissions.

Here, the editing unit may perform the editing by generating playback-route information that defines the contiguous playback of the first and second duplicate contents.

This configuration enables a plurality of duplicate contents resulting from the suspension/resumption of dubbing to be viewed contiguously, the same as the dubbing source, without actually editing the duplicate contents. Thus, even when editing is not permitted, the duplicate contents can be viewed without needing to worry about them being divided.

Here, the editing unit may perform the editing by generating management information for managing the first and second duplicate contents as a single contiguous content.

According to this configuration, the same content is recorded onto the first and second recording media after the end of the dubbing, even when the dubbing is suspended/resumed.

Here, the dubbing unit may secure, in a recording area of the second recording medium prior to the start of the dubbing, an area having the capacity required in the dubbing, and records the duplicate content in the secured area.

According to this configuration, it is possible to prevent there being insufficient recording area for the dubbing resumed after the end of unattended recording.

Consequently, dubbing is performed without the omission of any of the source content.

Here, the secured area may be a contiguous recording area.

According to this configuration, it is possible to prevent a plurality of duplicate contents relating to the same source content from being recorded in noncontiguous areas of the second recording medium, thus allowing the video streams of these duplicate contents to recorded in the same sequence as the source content.

This facilitates the editing of divided contents after the end of dubbing into a single content the same as the source content. This is particularly effective when either DVD+RW or DVD+R (i.e. content video streams need to be recorded in a contiguous area) is used as the second recording medium.

Furthermore, because duplicate contents for playback as a single playback route are recorded in a contiguous area, the need for random access is avoided, thus eliminating seek times and cutting power consumption, as well as improving noise reductions.

Here, the recording device may further include a deletion unit operable, if the dubbing is suspended, to delete the duplicate content recorded prior to the dubbing suspension, and the dubbing unit may perform the dubbing from the head of the source content if the dubbing is resumed.

This configuration enables a source content to be dubbed without being divided, even when dubbing is suspended.

Here, if the second recording medium is designated as the recording destination and has insufficient free capacity, the unattended-recording unit may change the recording destination to the first recording medium.

According to this configuration, it is possible to prevent the part of a content being omitted due to the recording capacity of the second recording medium running out in the middle of the unattended recording or the dubbing.

Here, the unattended-recording unit may perform the change in recording destination prior to the start of the unattended recording, if the total capacity required in the dubbing and the unattended recording exceeds the free capacity of the second recording medium.

According to this configuration, it is possible to prevent a content from being partially recorded on two recording media due to the recording capacity of the second recording medium running out during the unattended recording.

Here, the unattended-recording unit may perform the change in recording destination during the unattended recording, if the free capacity of the second recording medium is less than the capacity required in the dubbing after the dubbing resumption.

According to this configuration, even if the recording capacity of the second recording medium is used up during the unattended recording, it is possible to change the recording destination to the first recording medium and thus complete the unattended recording.

Thus, in the unattended recording, the broadcast content can be properly recorded without any omissions.

Here, the holding unit may be a rewritable nonvolatile memory.

This configuration prevents dubbing information from being lost even if the power supply to the recording device is cut.

Thus, even if power to the recording device is cut after the suspension of dubbing, it is possible to resume the dubbing after power has been restored.

BRIEF DESCRIPTION OF THE DRAWINGS

FIG. 4 shows presetting information held by a presetting-information holding unit 15;

FIGS. 5A & 5B show condition information held by a dubbing-information holding unit 16;

FIG. 6A shows a data structure of dubbing-status information held by dubbing-information holding unit 16;

FIG. 6B shows exemplary dubbing-status information;

FIGS. 12A & 12B are diagrams showing exemplary program list screens after dubbing;

FIG. 14A is a diagram showing a data structure of a playback-route information management (PRIM) table;

FIG. 14B is a diagram showing an exemplary PRIM table;

FIG. 14C is a diagram showing another exemplary PRIM table;

FIGS. 18A & 18B are diagrams illustrating exemplary GUI screens showing that contiguous viewing of duplicate contents resulting from the suspension/resumption dubbing is possible;

FIGS. 28A-28C are diagrams showing exemplary GUI screens according to embodiment 5.

BEST MODE FOR CARRYING OUT THE INVENTION

Embodiments of a recording device pertaining to the present invention are described below using the diagrams. Recording devices pertaining to the embodiments are integrated recorders that use hard disks (HD) and rewritable digital versatile disks (DVD) as recording media.

Figure 1:
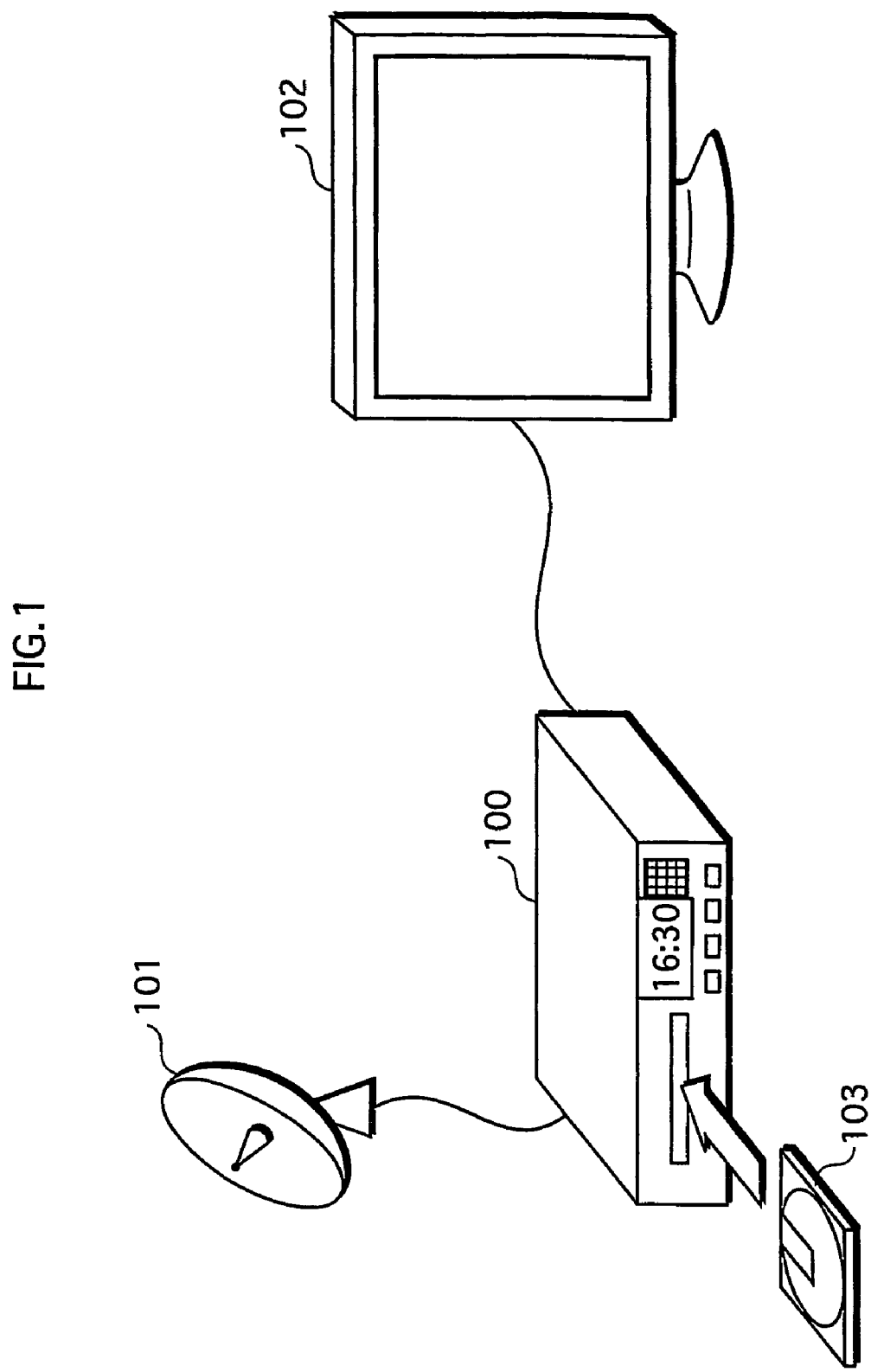
FIG. 1 is a diagram showing the structure of a hardware system that includes an integrated recorder 100.

FIG. 1 is a diagram showing the structure of a system that uses an integrated recorder pertaining to the present invention. The system shown in FIG. 1 is constituted from an integrated recorder 100, an antenna 101, a monitor 102, and a DVD 103.

Integrated recorder 100 is a device that converts contents in analogue broadcast signal format received via antenna 101 to MPEG2 format, and records the converted contents to HD or DVD 103. Recorder 100 is also able to dub contents recorded on HD to DVD 103.

Monitor 102 is a device that displays video data for output by integrated recorder 100. DVD 103 is a removable recording medium mountable in recorder 100. Specifically, write-once DVDs (e.g. DVD-R, DVD+R) and rewritable DVDs (e.g. DVD-RAM, DVD-RW, DVD+RW) can be used as DVD 103.

Figure 2:
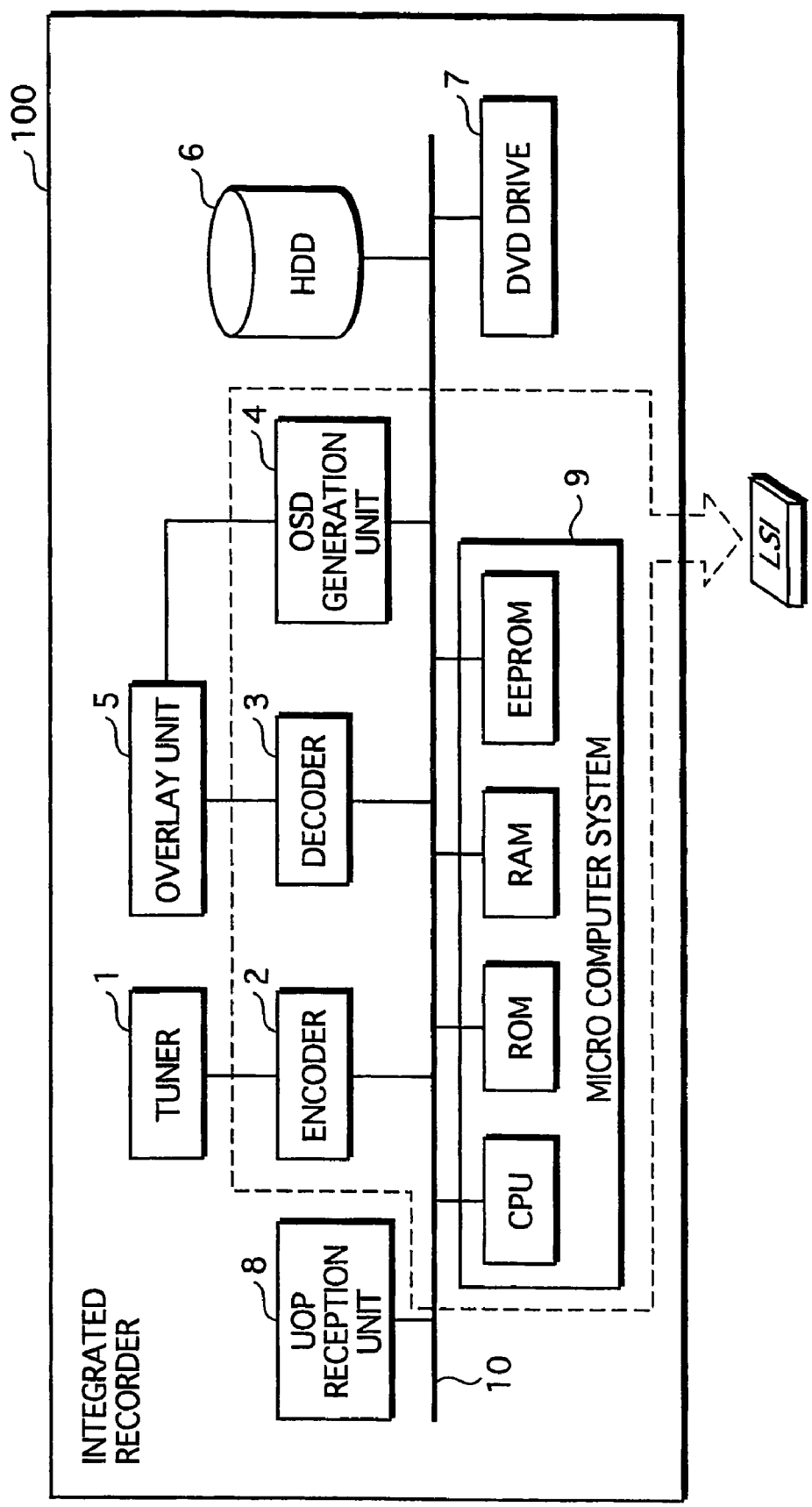
FIG. 2 is a diagram showing a hardware structure of integrated recorder 100.

The hardware structure of integrated recorder 100 will now be described. Recorder 100 includes, as shown in FIG. 2, a tuner 1, an encoder 2, a decoder 3, an on-screen display (OSD) generation unit 4, an overlay unit 5, a hard-disk (HD) drive 6, a DVD drive 7, a user operation (UOP) reception unit 8, a personal computer (PC) system 9, and a bus 10. Encoder 2, decoder 3, OSD generation unit 4, HD drive 6, DVD drive 7, and micro computer system 9 are mutually connected via bus 10.

Tuner 1 performs channel selection and demodulation of broadcast waves received by antenna 101, to acquire contents in analogue broadcast signal format.

Encoder 2 analogue-to-digital (A/D) converts contents in analogue broadcast signal format, and also compression encodes the converted contents in compliance with the MPEG2 format to generate contents in MPEG2 format.

Decoder 3 decompresses MPEG2-format contents, and also digital-to-analogue (D/A) converts the decompressed contents to convert the contents to analogue broadcast signal format.

OSD generation unit 4 generates image data for on-screen displays (OSDs) that show information relating to contents, integrated-recorder setting, and the like.

Overlay unit 5 overlays the OSD image data on contents in analogue broadcast signal format, and outputs the overlaid contents to monitor 102.

HD drive 6 writes/reads MPEG2-format contents respectively to/from a large-capacity internal hard disk (HD). Here, written to the HD together with each content is management information formed from an identifier (ID) uniquely identifying the content, the address of the area storing the content, a data amount, a playback time, and the like.

DVD drive 7 is operable to have DVD 103 mounted thereon, and performs writing and reading with respect to DVD 103. Here DVD 103, the same as the HD, also has management information written thereto together with contents. Also, playback (PL) route information in which an arbitrary interval relating to one or a plurality of contents is included as a playback interval can be further recorded on DVD 103.

UOP reception unit 8 receives user operations (UOPs) inputted via a remote controller.

Micro computer system 9 is a computer system formed from a CPU, ROM, RAM, and EEPROM. Computer programs stored on ROM are read to the CPU, and the read computer programs work together with hardware resources to achieve the functions of integrated recorder 100. Thus completes the description of the hardware structure of recorder 100.

Figure 3:
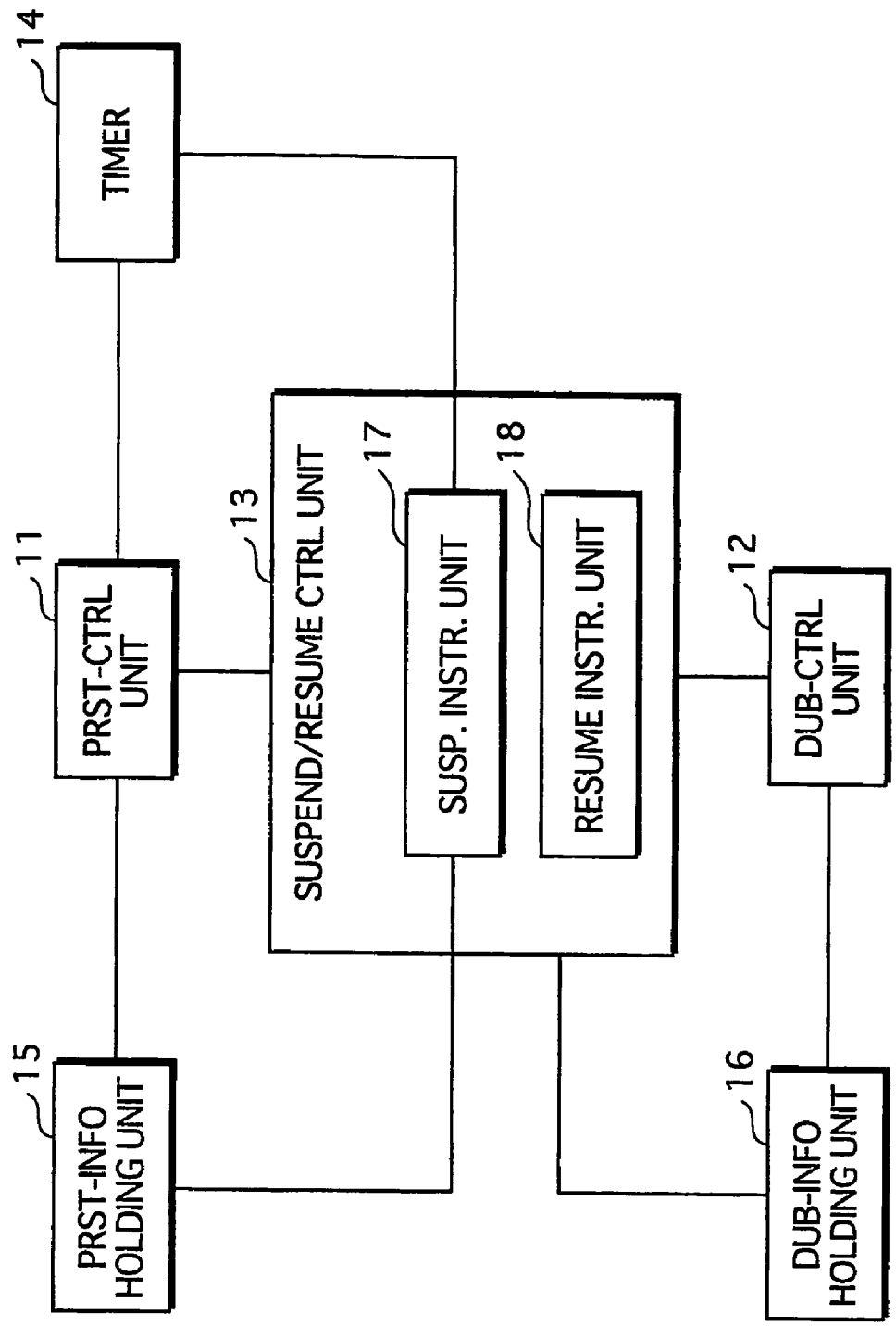
FIG. 3 is a block diagram showing a functional structure of a micro computer system 9.

The following description relates to the functions of micro computer system 9, which are realized by the computer programs working together with the hardware resources. FIG. 3 is a block diagram showing a functional structure of micro computer system 9. Micro computer system 9 is formed, as shown in FIG. 3, from a presetting control (PRST-CTRL) unit 11, a dubbing control (dub-CTRL) unit 12, a suspend/resume control (S/R-CTRL) unit 13, a timer 14, a presetting-information (PRST-info) holding unit 15, and a dubbing-information (dub-info) holding unit 16.

PRST-CTRL unit 11 controls the setting and processing of unattended recording. Setting controls include acquiring various types of information relating to contents for unattended recording, such as broadcast date, broadcast start and end times, channel, recording quality, and the recording medium on which to record the contents (hereinafter, "recording destination") by interactively receiving user operations via UOP reception unit 8 using OSD displays generated and overlaid by OSD generation unit 4 and overlay unit 5, and entering the acquired information in PRST-info holding unit 15 as presetting (PRST) information. Also, PRST-CTRL unit 11 notifies S/R-CTRL unit 13 when PRST information is entered.

Unattended recording controls, which are performed when the broadcast date and start time preset in the PRST information arrive, include (i) having tuner 1 select the preset channel and receive a content in analogue broadcast signal format, (ii) having encoder 2 encode the received content at an assigned bitrate specified by the recording quality, and (iii) having HD drive 6 or DVD drive 7 write the encoded content. Then, when the broadcast end time arrives, controls are performed to have tuner 1, encoder 2 and HD drive 6 or DVD drive 7 end the processing. Here, a feature of the unattended recording controls is PRST-CTRL unit 11 notifying S/R-CTRL unit 13 when recording starts and ends based on the PRST information.

Dub-CTRL unit 12 controls the condition setting and processing of dubbing. Condition settings include acquiring information such as the ID of contents for dubbing from HD to DVD 103 (hereinafter, "source contents") and the desired post-dubbing image quality (hereinafter, "dubbing quality"), by interactively receiving user operations using OSDs and the remote controller, and entering the acquired information in dub-info holding unit 16 as condition information. Unit 12 notifies S/R-CTRL unit 13 when condition information is entered.

A feature of the dubbing controls is dub-CTRL unit 12 notifying S/R-CTRL unit 13 of the status of the dubbing, and receiving instructions from unit 13 to suspend/resume the dubbing. After entering control information, unit 12, notifies unit 13 of the start of the dubbing, and then has HD drive 6 read a content based on the condition information, and has DVD drive 7 write the read content. When the dubbing quality in the condition information is set to the same quality as the source content (i.e. when high-speed dubbing is set), unit 12 has DVD drive 7 write the MGEG2-format content read by HD drive 6 without further processing. On the other hand, when the dubbing quality is set to a different quality from the source content (i.e. when re-encode dubbing is set), unit 12 has decoder 3 decode the MGEG2-format content read by HD drive 6, and has encoder 2 encode the content outputted from decoder 3 in uncompressed digital format at the set dubbing quality, before having DVD drive 7 write the re-encoded content. Unit 12 notifies unit 13 when the end of the source content is reached during dubbing.

When instructed by S/R-CTRL unit 13 to suspend the dubbing, dub-CTRL unit 12 has HD drive 6 stops the reading of the content and has DVD drive 7 write the read part of content to DVD 103, before notifying unit 13 of the position at which reading was stopped ("suspension position"), using the playback time from the head of the content.

When instructed by S/R-CTRL unit 13 to resume the dubbing, dub-CTRL unit 12 acquires dubbing-status (dub-stat) information from dub-info holding unit 16, and has HD drive 6 read the content from the suspension position shown in the acquired dub-stat information. Furthermore, unit 12 judges whether high-speed dubbing or re-encode dubbing has been set, based on the dubbing quality set in the dub-stat information. If high-speed dubbing has been sets unit 12 has DVD drive 7 write the content read by HD drive 6 without further processing. On the other hand, if re-encode dubbing has been set, unit 12 has decoder 3 decode the content read by HD drive 6 and encoder 2 encode the content outputted from decoder 3 in uncompressed digital format at the dubbing quality set in the dub-stat information, before having DVD drive 7 write the re-encoded content. This is a feature of the dubbing.

S/R-CTRL unit 13 includes a suspend-instruction unit 17 and a resume-instruction unit 18, and controls the suspension/resumption of dubbing. Dubbing is suspended as a result of controls performed by unit 17. A feature of the suspension controls is unit 17 instructing dub-CTRL unit 12 to suspend the dubbing at a point in time (hereinafter "suspension time") that leaves enough time prior to the broadcast date/start-time set in the PRST information for the suspension of dubbing to be performed, receiving, in reply, notification of the dubbing suspension position from unit 12, and entering dub-stat information in dub-info holding unit 16 that has set therein the notified suspension position, a suspension reason showing suspension due to the start of unattended recording, and the ID of the content (hereinafter "duplicate content") recorded on DVD 103 as a result of the dubbing. If suspension/resumption is repeated a plurality of times during the dubbing of a single source content, however, dub-stat information will already have been entered in unit 16 from the second suspension onwards. In this case, unit 13 updates the suspension position and suspension reason in the existing dub-stat information, increases by 1 the number of duplicate contents (i.e. "duplicate no.") set in dub-stat information, and adds the ID of the duplicate content.

Note that the time period needed to suspend the dubbing arises from the timelag between stopping the content reading from HD and the end of content writing to DVD 103. This timelag varies depending on whether high-speed dubbing or re-encode dubbing is being performed, with the timelag generally being longer in the case of re-encode dubbing.

Dubbing is resumed as a result of controls performed by resume-instruction unit 18. A feature of the resumption controls is unit 18 instructing dub-CTRL unit 12 to resume the dubbing if dub-stat information is entered in dub-info holding unit 16 when notified by PRST-CTRL unit 11 that unattended recording has ended, and the suspension reason set in the dub-stat information indicates that dubbing was suspended due to the start of unattended recording.

Dubbing may be suspended for reasons other than the start of unattended recording. For example, with conventional DVD recorders, dubbing is suspended when DVD 103 is filled to capacity during dubbing, and then resumed upon DVD 103 being replaced by an unwritten DVD. When this situation arises with integrated recorder 100 pertaining to the present invention, the suspension reason set in dub-stat information at a time of suspending the dubbing shows that the suspension resulted from DVD 103 being filled up. In this case, unattended recording is executed if a preset recording time arrives, although because "unattended recording" is not set as the suspension reason in the dub-stat information, resumption of dubbing is instigated by the replacement of DVD 103 for a new DVD, and not when the unattended recording ends.

Timer 14 notifies PRST-CTRL unit 11 and S/R-CTRL unit 13 of the arrival of broadcast start times set in PRST information and suspension times corresponding to the broadcast start times.

PRST-info holding unit 15 and dub-info holding unit 16 are areas secured in EEPROM by the execution of computer programs, unit 15 holding PRST information in the format shown in FIG. 4, and unit 16 holding condition information in the format shown in FIG. 5A and dub-stat information in the format shown in FIG. 6A. Because EEPROM is a nonvolatile memory, this information is not erased, even when power to integrated recorder 100 is cut. This means that even if power to integrated recorder 100 is cut after the suspension of dubbing, it is possible to resume the dubbing after power has been restored. Thus completes the description of the functional structure of micro computer system 9.

Computer programs that realize this functional structure are described next. Computer programs for realizing PRST-CTRL unit 11, dub-CTRL unit 12, and S/R-CTRL unit 13 are created by using a computer language to describe the procedures shown in FIGS. 7, 8, and 9. Firstly, the processing performed by unit 13 is described with reference to FIG. 7.

S/R-CTRL unit 13, which has a flag f (not depicted), initializes flag f to "OFF" at step S1 when integrated recorder 100 is activated, and then enters into an event-wait loop consisting of steps S2 to S5. Flag f is a flag showing the operation status of the dubbing.

When notified by dub-CTRL unit 12 that condition information has been entered (S2=YES), S/R-CTRL unit 13 instructs unit 12 to commence the dubbing (S6), waits for a response indicating that dubbing has been started (S7), and sets flag f to "ON" when notified of the dubbing start (S8). Unit 13 calculates a suspension time from the broadcast date/start-time set in the PRST information, and sets the calculated suspension time in timer 14 (S9), before returning to the event-wait loop of steps S2 to S5.

When notified by dub-CTRL unit 12 that the dubbing has been completed until the end of the source content (S3=YES), S/R-CTRL unit 13 sets flag f to "OFF" (S10), and deletes the dubbing-status information entered in dub-info holding unit 16 (S11), before returning to the event-wait loop of steps S2 to S5.

When notified by timer 14 that the suspension time has arrived (S4=YES), S/R-CTRL unit 13 judges whether flag f is set to "ON". If "OFF" (S12=NO), unit 13 returns to the event-wait loop of steps S2 to S5 without further processing. If flag f is set to "ON" (S12=YES), unit 13 instructs dub-CTRL unit 12 to suspend the dubbing (S13), waits for a response in which the playback time at the time of the suspension is used to show the suspension position (S14), enters dub-stat information in dub-info holding unit 16 that has set therein the notified suspension position, a suspension reason showing suspension due to the start of unattended recording, and the ID of the duplicate content (S15), and sets flag f to "OFF", before returning to the event-wait loop of steps S2 to S5.

When notified by PRST-CTRL unit 11 that the unattended recording has ended (S5=YES), S/R-CTRL unit 13 judges whether dub-stat information has been entered in dub-info holding unit 16 (S17). If dub-stat information has been entered, unit 13 judges whether the suspension reason set in the dub-stat information indicates that suspension was due to the start of unattended recording (S18). If judged in the negative to either of the judgments at steps S17 and S18, unit 13 returns to the event-wait loop of steps S2 to S5 without further processing. If judged in the affirmative for both steps S17 and S18, unit 13 instructs dub-CTRL unit 12 to resume the dubbing, waits for a response showing that dubbing has been resumed (S20), and sets flag f to "ON" (S21), before returning to the event-wait loop of steps S2 to S5. Thus completes the description of the suspend/resume processing procedure performed by S/R-CTRL unit 13.

The dubbing procedure performed by dub-CTRL unit 12 is described next with reference to FIG. 8. The processing of steps S31 to S34 equates to an event-wait loop in unit 12.

When instructed by S/R-CTRL unit 13 to start the dubbing (S31=YES), dub-CTRL unit 12 reads condition information from dub-info holding unit 16 (S35), and instructs encoder 2, decoder 3, HD drive 6, and DVD recorder 7 to dub the content set in the read condition information according to the specified dubbing method (S36). Specifically, if the dubbing method in the condition information is set to re-encode dubbing, unit 12 instructs HD drive 6 to read the content set in the condition information, decoder 3 to decode the read content, encoder 2 to encode the decoding result at the set dubbing quality, and DVD drive 7 to write the encoding result. On the other hand, if the dubbing method in the condition information is set to high-speed dubbing, unit 12 instructs HD drive 6 to read the content set in the condition information, and DVD drive 7 to write the read content. After initiating the above hardware controls, unit 12 notifies unit 13 of the start of dubbing (S37), and returns to the event-wait loop of steps S31 to S34.

When instructed by S/R-CTRL unit 13 to resume the dubbing (S32=YES), dub-CTRL unit 12 reads dub-stat information from dub-info holding unit 16 (S38), and initiates controls of encoder 2, decoder 3, HD drive 6 and DVD drive 7 to read the content set in the dub-stat information from the set suspension position, and perform dubbing in accordance with the set dubbing method (S39). These hardware controls are performed in the same manner as those at step S36. After initiating these hardware controls, unit 12 notifies unit 13 that dubbing has been resumed (S40), and returns to the event-wait loop of steps S31 to S34.

When instructed by S/R-CTRL unit 13 to suspend the dubbing (S33=YES), dub-CTRL unit 12 has HD drive 6 stop the content reading, and waits for all of the processing in decoder 3, encoder 2 and DVD drive 7 that relates to the read part of the content video stream to be completed, before deactivating this hardware (S41). After deactivating DVD drive 7, unit 12 sends the position at which HD drive 6 stopped the reading to unit 13 to notify the suspension of dubbing (S42), and returns to the event-wait loop of steps S31 to S34.

If the dubbing has been completed until the end of the source content (S34=YES), dub-CTRL unit 12 deactivates encoder 2, decoder 3, HD drive 6 and DVD drive 7 (S43), and notifies S/R-CTRL unit 13 that the dubbing has ended (S44), before returning to the event-wait loop of steps S31 to S34. Thus completes the description of the processing procedure performed by dub-CTRL unit 12.

Figure 9:
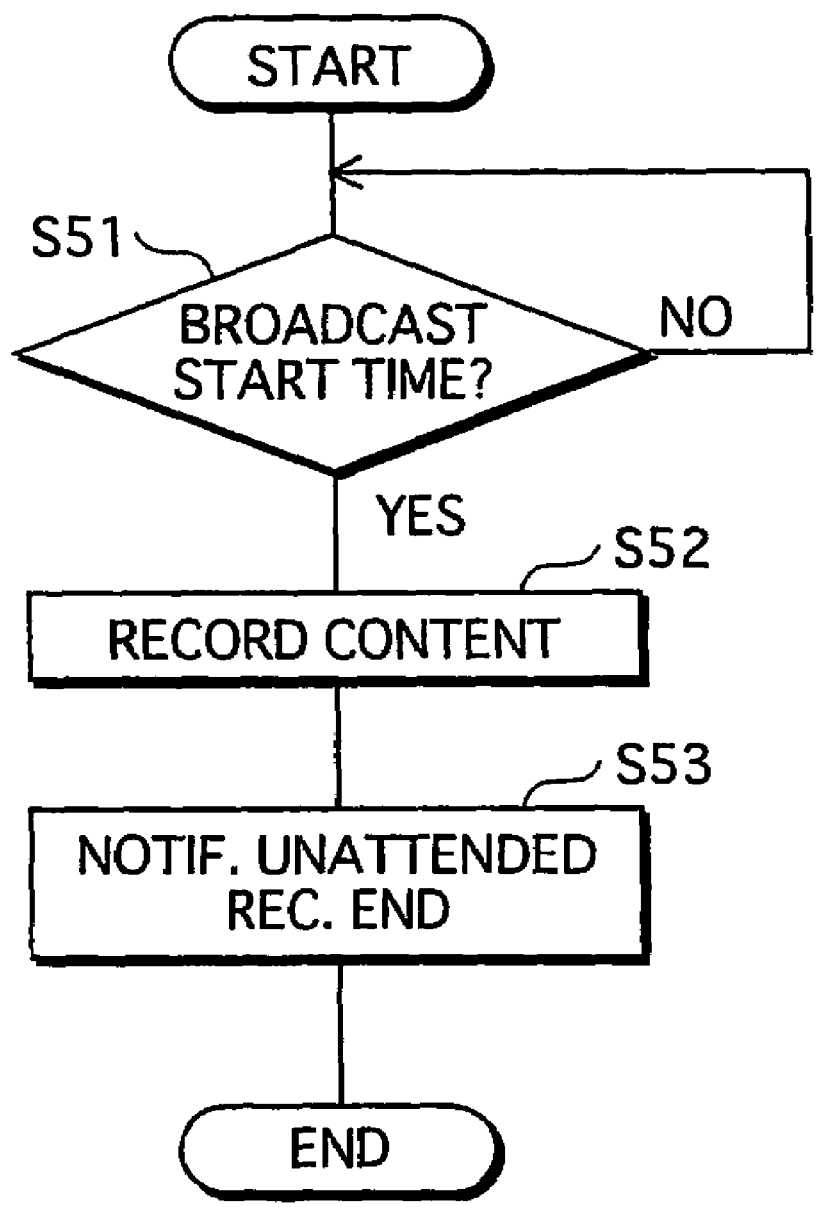
FIG. 9 is a flowchart showing an unattended recording procedure.

The unattended recording procedure performed by PRST-CTRL unit 11 is described next with reference to FIG. 9. Step S51 is a loop in which unit 11 waits for the arrival of a broadcast start time preset in PRST information. When notified by timer 14 that a broadcast start time has arrived (S51=YES), unit 11 acquires the broadcast end time, channel, recording quality, and recording destination from the PRST information, has tuner 1 select the specified channel and receive the content, has encoder 2 encode the received content, and has whichever of HD drive 6 and DVD drive 7 is designated as the recording destination record the encoding result (S52).

After the broadcast end time has arrived and the unattended recording has been completed, PRST-CTRL unit 11 notifies S/R-CTRL unit 13 that the unattended recording has ended (S53), and then returns to the S51 loop to wait for the arrival of the broadcast start time of the next content for unattended recording. Thus completes the description of the unattended recording procedure performed by unit 11.

According to the above processing procedure, dubbing is suspended when unattended recording is initiated and resumed after unattended recording has ended, thus enabling contents to be properly written in both dubbing and unattended recording operations.

Figure 10:
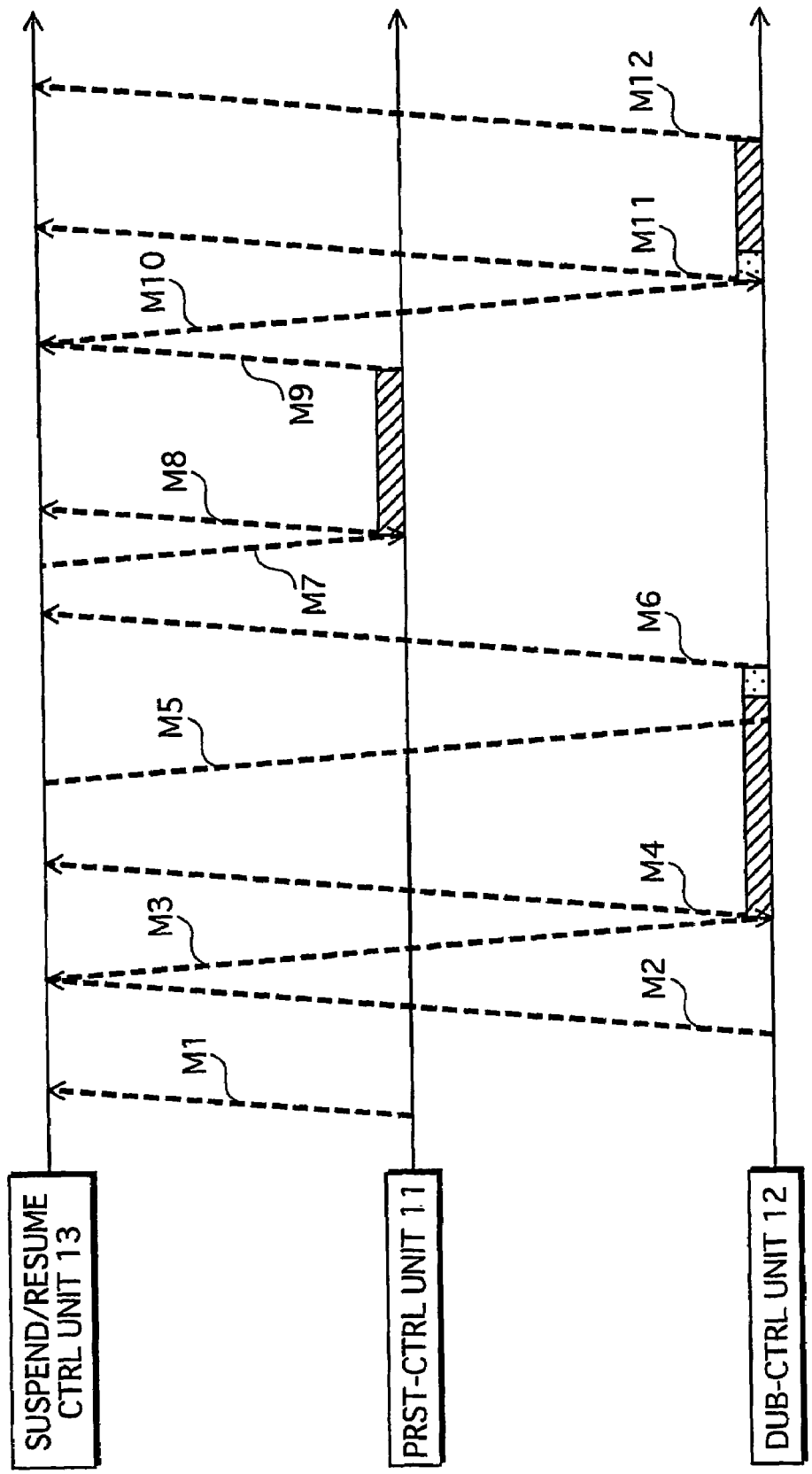
FIG. 10 is a timing chart showing exemplary operations performed by a presetting control unit 11, a dubbing control unit 12, and a suspend/resume control unit 13.
Figure 11A:
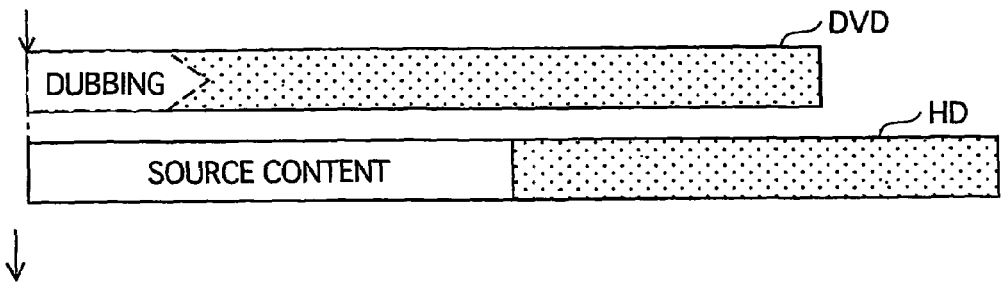
FIGS. 11A-11D are diagrams schematically showing the transition that takes place in recording involving HD and DVD.
Figure 11B:
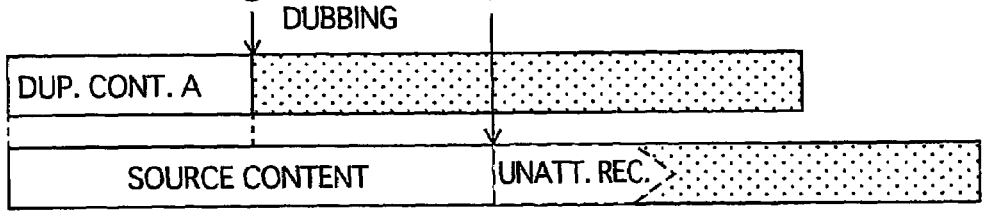
Figure 11C:
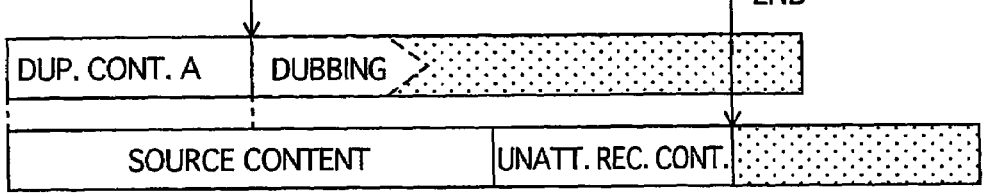
Figure 11D:
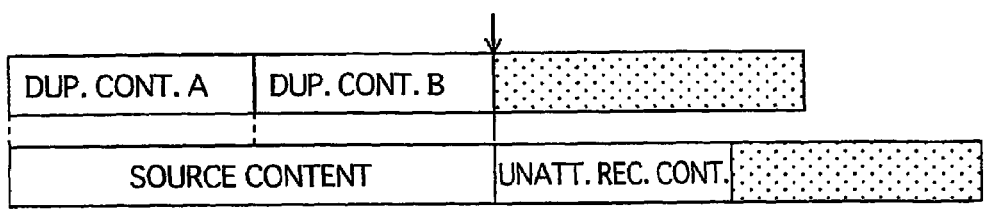
Figure 13A:
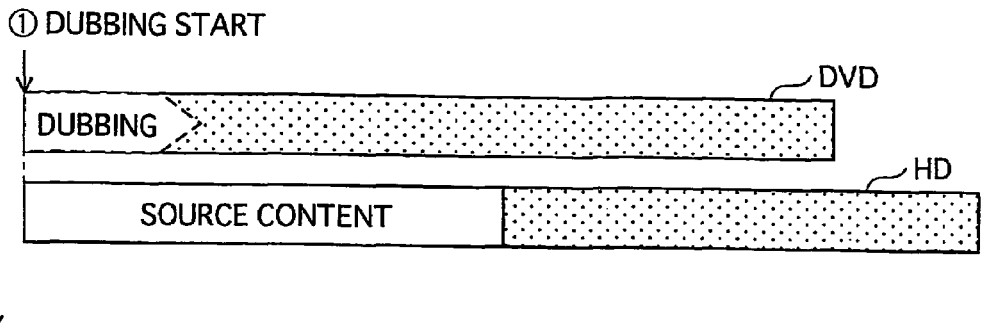
FIGS. 13A-13D are diagrams schematically showing the transition that takes place in recording when the start time of unattended recording to DVD arrives during dubbing from HD to DVD.
Figure 13B:
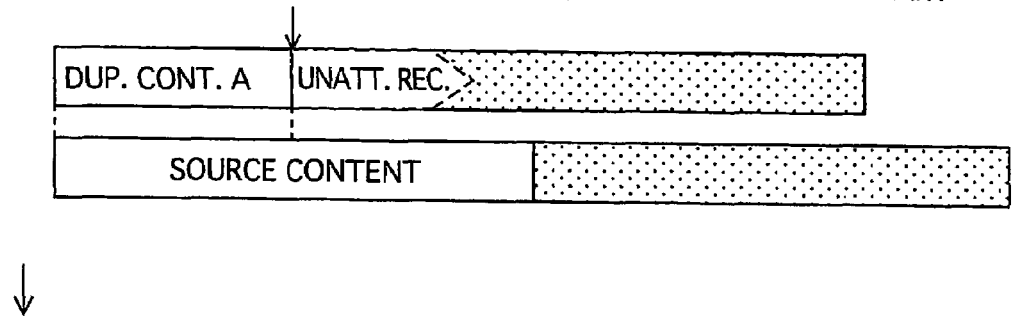
Figure 13C:
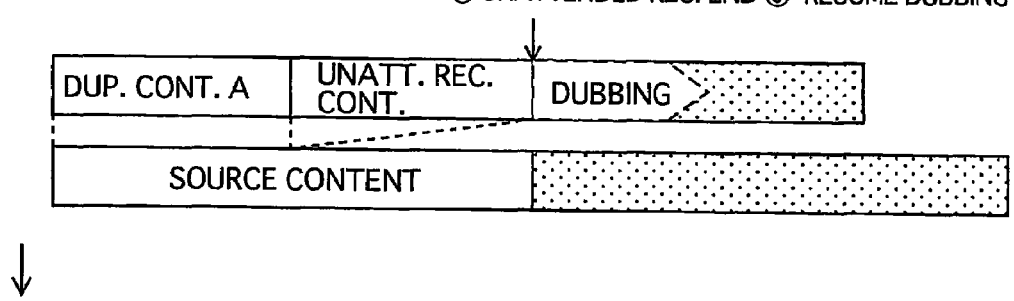
Figure 13D:
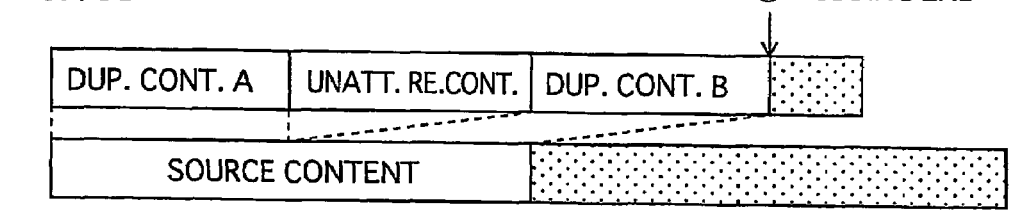

An example of the operations performed by integrated recorder 100 having the above structure is given here with reference to FIGS. 10, 11 and 12. The operation flow of recorder 100 is as follows when a preset broadcast start time arrives during the dubbing of a source content from HD to DVD 103. The first, second and third rungs in FIG. 10 show the operations of S/R-CTRL unit 13, PRST-CTRL unit 11, and dub-CTRL unit 12, respectively.

PRST-CTRL unit 11 notifies S/R-CTRL unit 13 when the user sets unattended recording (M1), and dub-CTRL unit 12 notifies unit 13 when the user sets dubbing with unattended recording having been set (M2).

When notified that dubbing has been set (M2), S/R-CTRL unit 13 instructs dub-CTRL unit 12 to commence the dubbing (M3). In response, unit 12 commences the dubbing from HD to DVD 103 (① in FIG. 11A) and notifies unit 13 (M4).

When the broadcast start time approaches during the dubbing, S/R-CTRL unit 13 instructs dub-CTRL unit 12 to suspend the dubbing (M5), and unit 12, in response, suspends the dubbing (② in FIG. 11B) and notifies unit 13 (M6). The content video stream dubbed to DVD 103 up to this point from the start of dubbing is managed as duplicate content A.

Having been notified of the dubbing suspension (M6), S/R-CTRL unit 13 instructs PRST-CTRL unit 11 to initiate the unattended recording, when the preset recording time is reached (M7). In response, unit 11 initiates the unattended recording (③ in FIG. 11B), and notifies unit 13 (M8). Then, when the preset broadcast end time is reached, unit 11 ends the unattended recording (④ in FIG. 11C) and notifies unit 13 (M9).

Since dubbing is again possible once the unattended recording has ended, S/R-CTRL unit 13 instructs dub-CTRL unit 12 to resume the dubbing (M10), and, in response, unit 12 resumes the dubbing from the suspension position of the source content (⑤ in FIG. 11C) and notifies unit 13 (M11).

When the source content has been completely dubbed (⑥ in FIG. 11C), dub-CTRL unit 12 notifies S/R-CTRL unit 13 (M12). The content video stream dubbed to DVD 103 up to this point from the resumption of dubbing is managed as duplicate content B.

As a result of the above operations, duplicate contents A and B are recorded on DVD 103, as shown on the DVD program list screen in FIG. 12A. The entire video stream relating to the source content has been dubbed to DVD 103, although divided into duplicate contents A and B. Also, the content for unattended recording has been successfully recorded to HD, as shown on the HD program list screen in FIG. 12B.

According to present embodiment as described above, when the preset broadcast start time of a content draws near during the dubbing of a source content, the unattended recording is executed after firstly suspending the dubbing and saving information showing the suspension position, and then after the end of the unattended recording, the dubbing is resumed from the suspension position, based on the saved information, thus making it possible to successfully complete both unattended recording and dubbing.

Note that while the present embodiment is described above in relation to a recording device capable of successfully completing the dubbing of source contents while giving priority to unattended recording, a recording device according to the present invention may be structured to switch between prioritizing the dubbing (i.e. as with conventional recording devices) and prioritizing the unattended recording. This switching may be realized by the setting of information (hereinafter "priority information") showing whether to prioritize the dubbing when a preset recording time arrives during dubbing, in addition to the source ID and the dubbing quality settings (i.e. condition settings) controlled by dub-CTRL unit 12, and entering this condition information in dub-info holding unit 16 in the format shown in FIG. 5B. If the priority information is set to "YES", unattended recording whose start time arrives during dubbing is not executed (i.e. as with conventional recording devices), and if the priority information is set to "NO", S/R-CTRL unit 13 executes the suspend/resume controls described above. By enabling this switching to be performed, it is also possible to respond to the demands of a user who wants to complete the dubbing quickly before leaving the house, for example.

Also, while the recording destination of contents in the unattended recording of the present embodiment is given as the HD, the recording destination may be DVD 103. FIGS. 13A-13D are diagrams schematically showing the transition that takes place in recording when the start time of unattended recording to DVD arrives during dubbing from HD to DVD. In this case, the content for unattended recording is written to the recording area of DVD 103 after duplicate content A, following the suspension of dubbing (see FIG. 13B), and duplicate content B is written following the end of the unattended recording (see FIG. 13C). As a result, DVD 103 has recorded thereon the entire video stream of the source content (divided between duplicate contents A and B) as well as the content that was preset for unattended recording (see FIG. 13D).

Embodiment 2

In Embodiment 1, the suspension and resumption of dubbing results in the source content being dubbed to DVD 103 as a plurality of duplicate contents. To view the content dubbed to DVD 103, the user needs to playback the plurality of duplicate contents in order. Embodiment 2 relates to the editing of playback (PL) route information that allows the plurality of contents to be played contiguously as a single playback route.

Firstly, PL-route information is described. Recorded on DVD 103 in addition to the content is a playback-route information management (PRIM) table. FIG. 14A shows a data structure of a PRIM table. The information entered in the PRIM table includes a playback (PL) route number 141 and the same number of pieces of PL-route information 142 as PL-route number 141. Each piece of PL-route information 142 includes a playback (PL) route ID 142$a$, a playback (PL) interval number 142$b$, and the same number of pieces of playback (PL) interval information 142$c$ as PL-interval number 142$b$. Each piece of playback interval information 142$c$ is formed from a content ID 142$d$ uniquely identifying a content for playback, and playback start and end positions 142$e$ and 142$f$ that indicate the In and Out points using the playback time from the head of the content. A playback route formed from one or a plurality of content video streams can be managed using a PRIM table having the above data structure.

Integrated recorder 100 reads the PRIM table from DVD 103, OSD displays the entered playback routes using a playback list screen, and receives user selections of desired playback routes. Having received a playback route selection, recorder 100 contiguously plays the playback intervals included in the selected playback route in order, thus enabling the user to contiguously view one or a plurality of content video streams.

Figure 15:
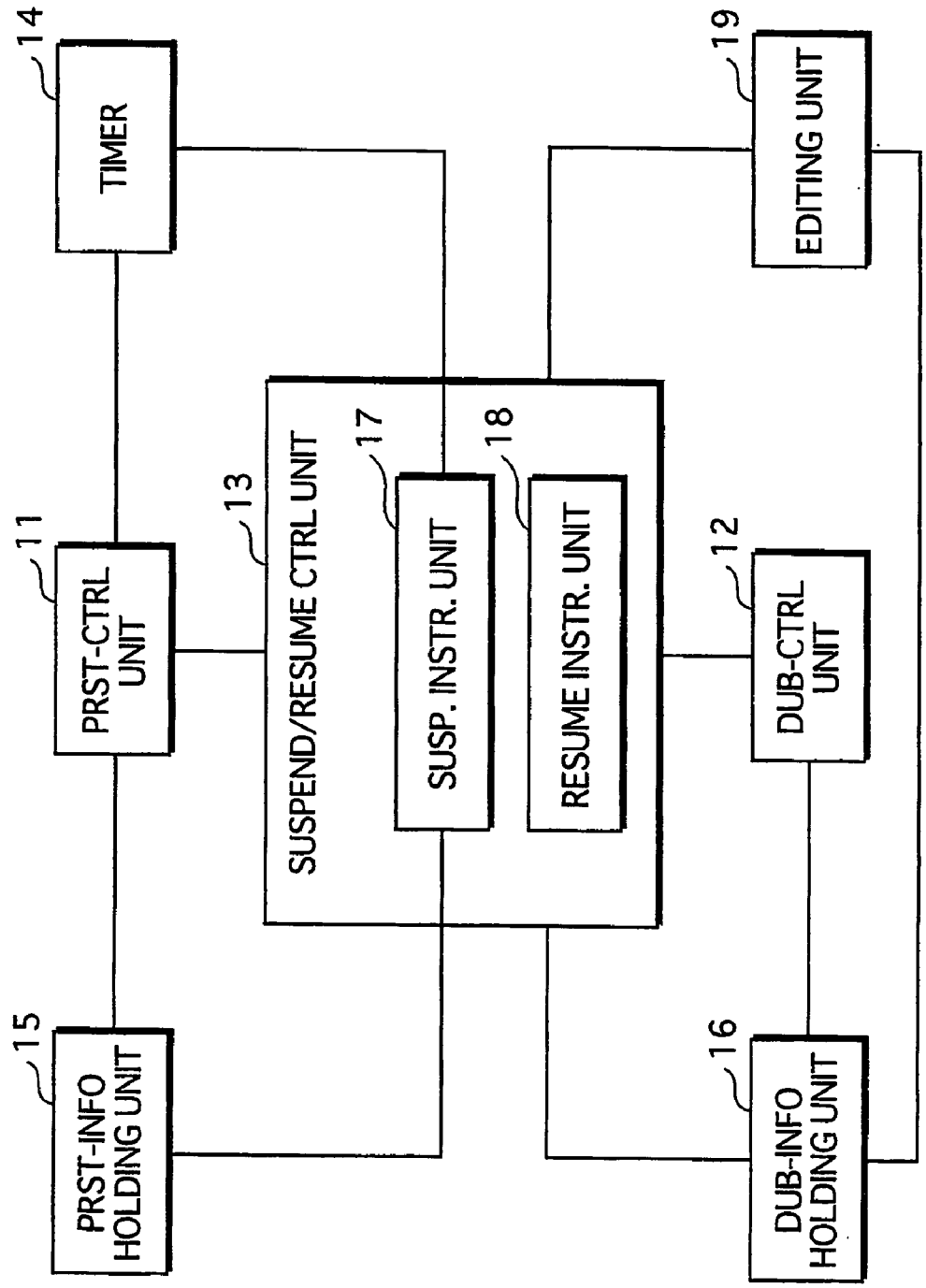
FIG. 15 is a diagram showing a functional structure of a micro computer system 9 pertaining to an embodiment 2.

The following description relates to a micro computer system 9 that manages a plurality of duplicate contents resulting from the suspension/resumption of dubbing as a single playback route. To edit the PL-route information, micro computer system 9 executes different computer programs to those in embodiment 1. FIG. 15 is a diagram showing the functional structure of micro computer system 9 pertaining to embodiment 2. FIG. 15 differs from FIG. 3 in the inclusion of an editing unit 19.

In the present embodiment, S/R-CTRL unit 13, when notified by dub-CTRL unit 12 that the dubbing has ended, instructs editing unit 19 to edit PL-route information if dub-stat information is being held by dub-info holding unit 16.

Editing unit 19 generates PL-route information in which all of the duplicate contents that result from the dubbing from a single source content are included in a playback interval, and enters the generated information in the PRIM table of DVD 103. PL-route information is generated by editing unit 19 reading dub-stat information from dub-info holding unit 16 when instructed by S/R-CTRL unit 13 to edit PL-route information, setting the PL-interval number to the number of duplicate contents shown in the read dub-stat information, and setting pieces of PL-interval information in which the head and end of contents identified by the duplicate IDs entered in the dub-stat information are given as the start and end positions of playback. At this time, the pieces of PL-interval information in the PL-route information are set in the same order as the duplicate IDs in the dub-stat information.

For example, if dub-info holding unit 16 holds the dub-stat information shown in FIG. 6B, the PRIM table recorded in DVD 103 is, according to embodiment 1, edited to look like FIG. 14B after the end of the dubbing. The dub-stat information in FIG. 6B shows that a content having the ID "101" was dubbed to DVD 103 as two contents having the IDs "201" and "203", while the PRIM table in FIG. 14B shows that the two contents identified by content IDs 201 and 203 are managed as separate playback routes. According to embodiment 2, on the other hand, the PRIM table looks like FIG. 14C when edited on the basis of the dub-stat information in FIG. 6B. The PRIM table in FIG. 14C shows that the two contents identified by content IDs 201 and 203 are managed as a single playback route.

Figure 16:
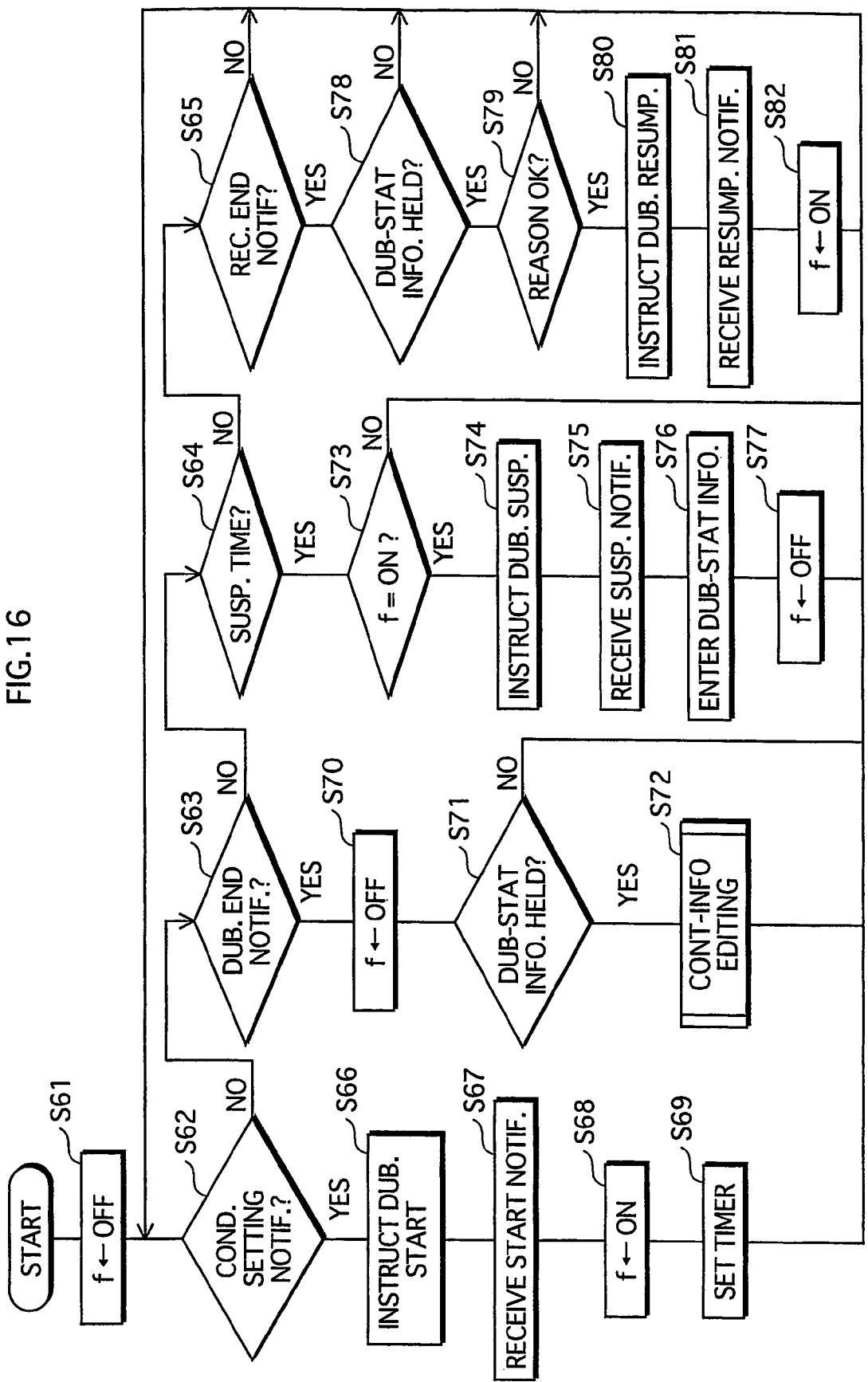
FIG. 16 is a flowchart showing a suspend/resume control procedure pertaining to embodiment 2.

A computer program that realizes the above functional structure is described next. This computer program is created by using a computer language to describe the procedure shown in the FIG. 16 flowchart. FIG. 16 is a flowchart showing a suspend/resume control procedure relating to embodiment 2. FIG. 16 differs from the control procedure shown in FIG. 7 in the addition of steps S71 and S72 to the procedure performed when S/R-CTRL unit 13 is notified by dub-CTRL unit 12 that dubbing has been completed (S63=YES). Specifically, unit 13 judges, at step S71, whether dub-stat information has been entered in dub-info holding unit 16, and if dub-stat information has been entered (S71=YES), unit 13 instructs, at step S72, editing unit 19 to edit PL-route information. Since dub-stat information is being held in unit 16 when the dubbing of a source content is suspended, unit 19 is instructed to edit the PL-route information when a plurality of duplicate contents results from the suspension/resumption of dubbing.

Figure 17:
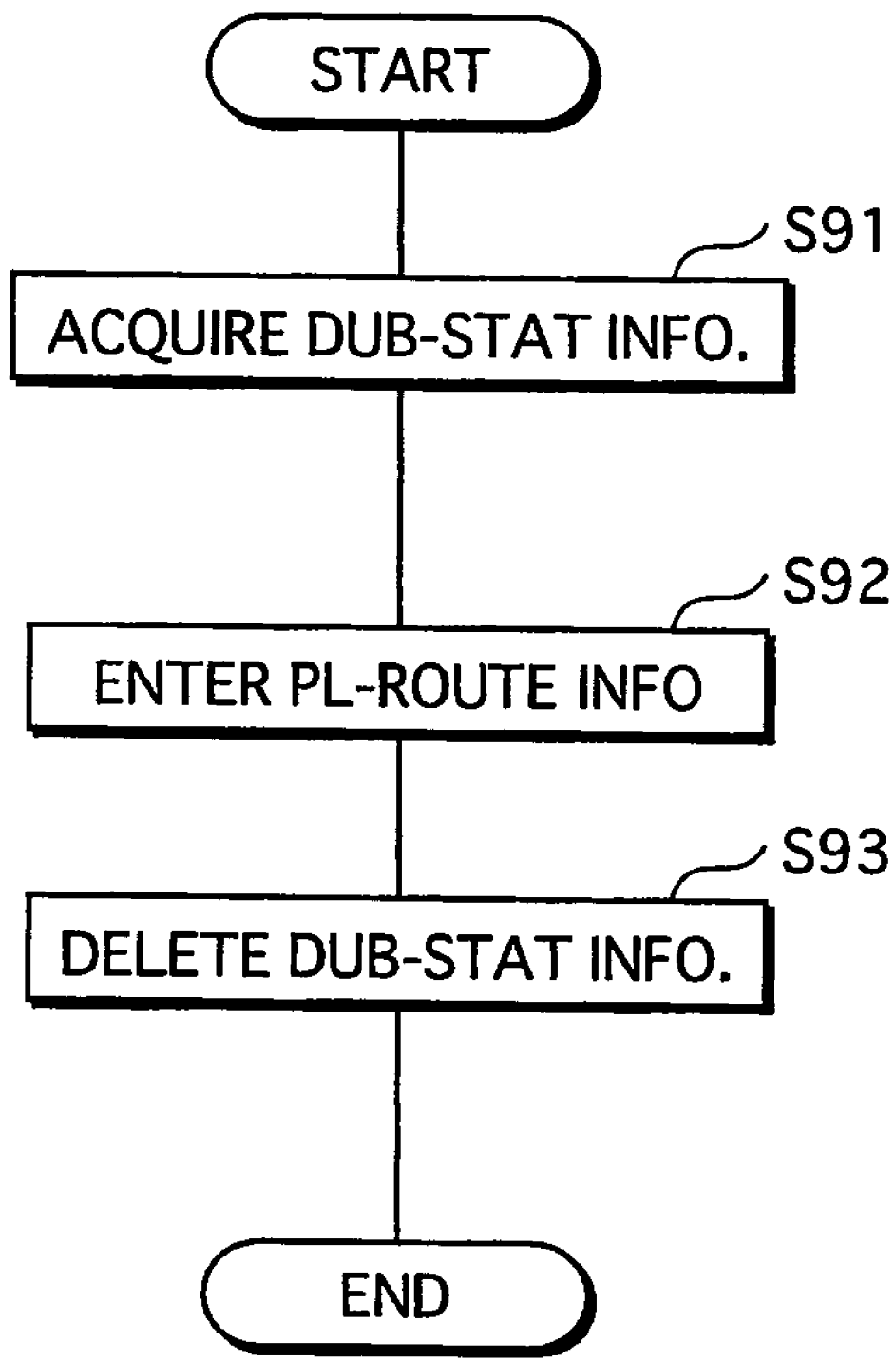
FIG. 17 is a flowchart showing an editing procedure performed on playback-route information by an editing unit 19.
Figure 19A:
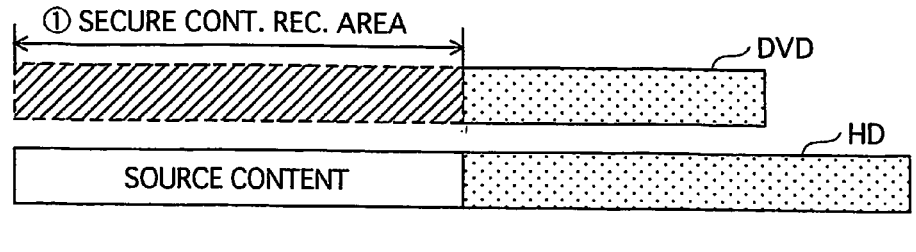
FIGS. 19A-19E are diagrams schematically showing the transition that takes place in recording, according to an embodiment 3.
Figure 19B:
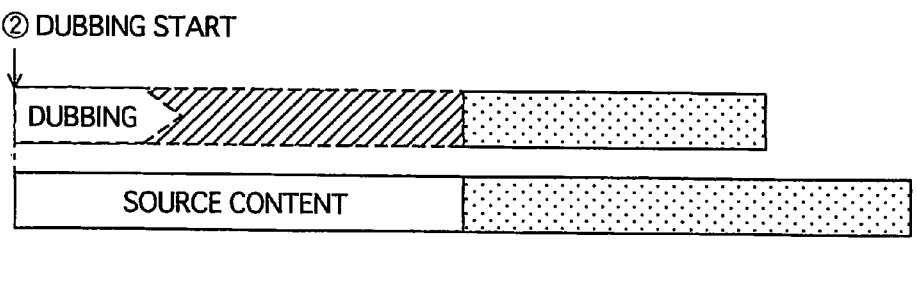
Figure 19C:
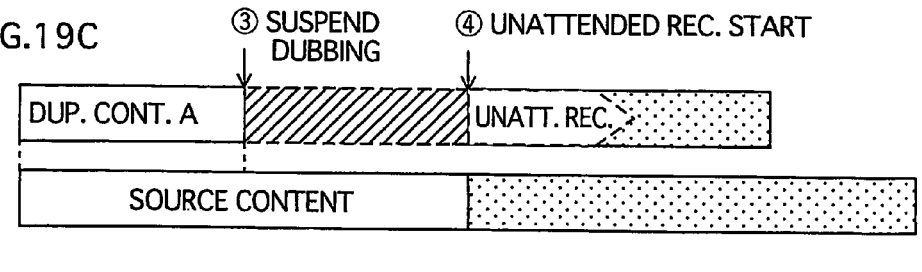
Figure 19D:
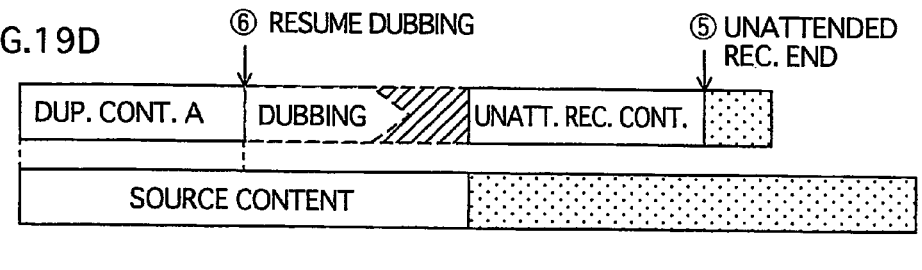
Figure 19E:
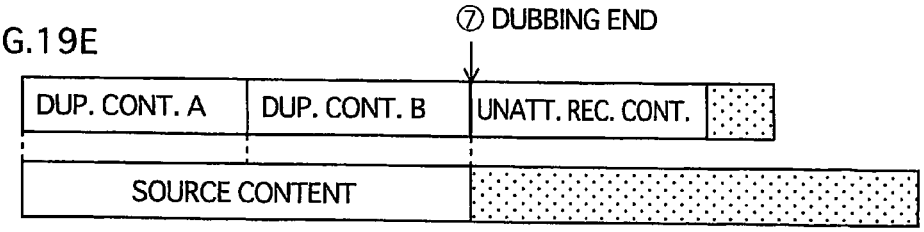

FIG. 17 is a flowchart showing a procedure performed by editing unit 19 to edit PL-route information. Unit 19 reads dub-stat information from dub-info holding unit 16 (S91), generates PL-route information based on the read dub-stat information, enters the generated information in the PRIM table recorded on DVD 103 (S92), and deletes the dub-stat information entered in unit 16. Thus completes the description of the PL-route information editing procedure.

As a result of the above procedure, PL-route information is generated in which a plurality of duplicate contents generated during dubbing is managed as a single playback route. Thus with the present embodiment, even if a source content is divided up as the result of the suspension/resumption of dubbing so that duplicate contents are recorded in non-contiguous areas of the DVD, a playback list screen such as shown in FIG. 18A is displayed to the user, making it is possible to view the duplicate contents in the same manner as the dubbed source content.

Note that while, in the present embodiment, PL-route information for managing a plurality of duplicate contents as a single playback route is generated in order to allow viewing of the duplicate contents in the same manner as the source content, the same effect may be achieved by editing the plurality of duplicate contents into a single content after the end of the dubbing, and presenting the program list screen shown in FIG. 18B to the user. This can be performed by editing the management information of contents recorded on DVD 103.

Embodiment 3

A feature of embodiment 3 is that the recording capacity required for the dubbing is calculated and secured in a contiguous recording area of DVD 103 at the start of the dubbing.

FIGS. 19A to 19E are diagrams schematically showing the transition of recording, according to embodiment 3. The operations for securing a contiguous recording area in DVD 103 at the start of dubbing are as follows.

Firstly, after setting the condition information, a contiguous recording area required in the dubbing set in the condition information is secured (1), and then the dubbing of the source content to the secured area is commenced (2).

When the preset recording time draws near during the dubbing, the dubbing is suspended (3), and when the preset time arrives, the writing of the preset content to a free-space area of DVD 103 other than the secured area is commenced (4).

When the preset end time arrives, the unattended recording is ended (5), and dubbing to the secured area of the section of the source content beyond the suspension position is commenced (6).

When the source content has been dubbed to the very end, the dubbing is stopped (7). Thus concludes the description of the operations relating to embodiment 3.

Figure 20:
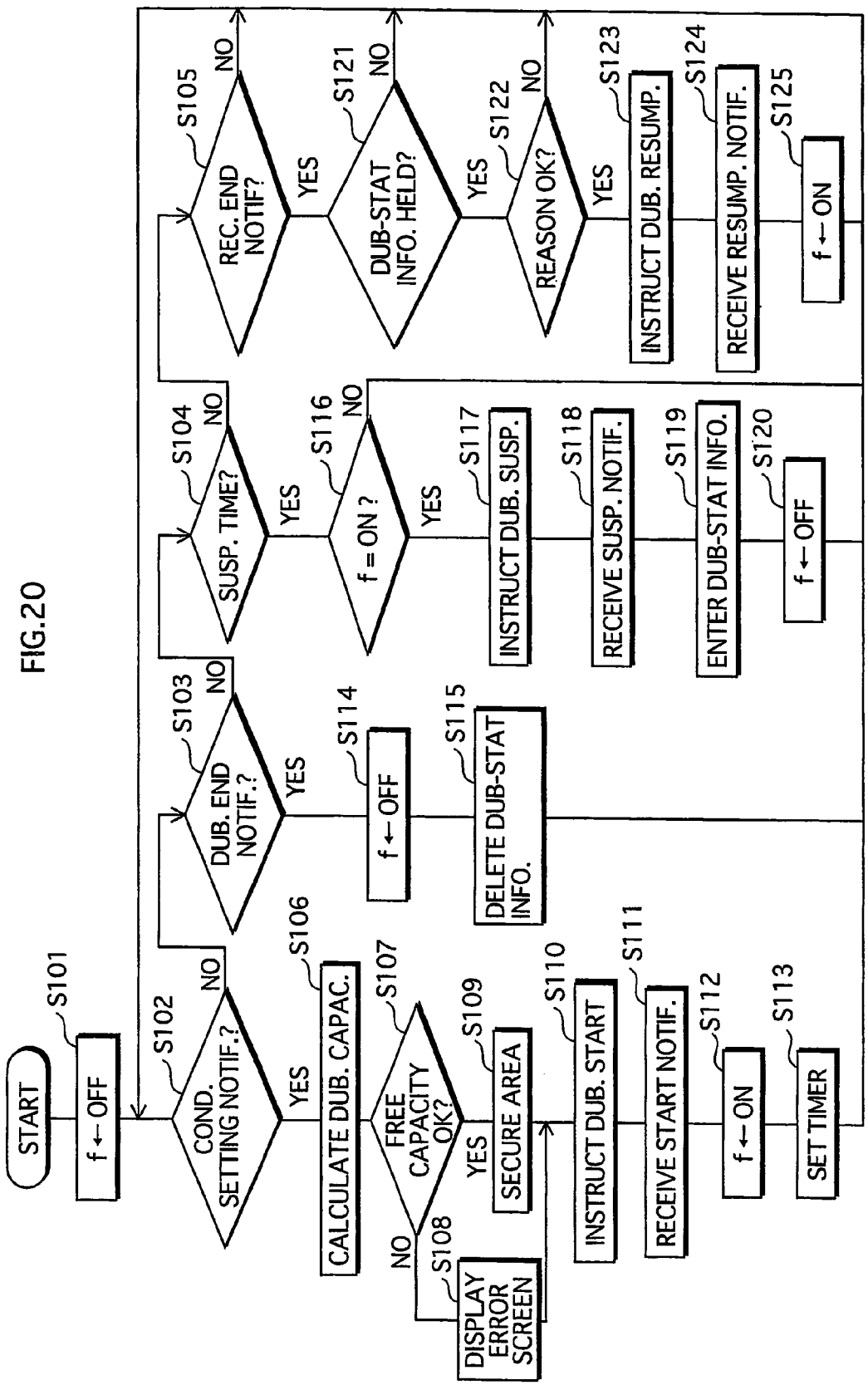
FIG. 20 is a flowchart showing a suspend/resume control procedure pertaining to embodiment 3.

The above operations are realized as a result of the processing procedure shown in the FIG. 20 flowchart being described using a computer language, and the generated computer program being executed by micro computer system 9. FIG. 20 is a flowchart showing the suspend/resume procedure relating to embodiment 3.

Figure 7:
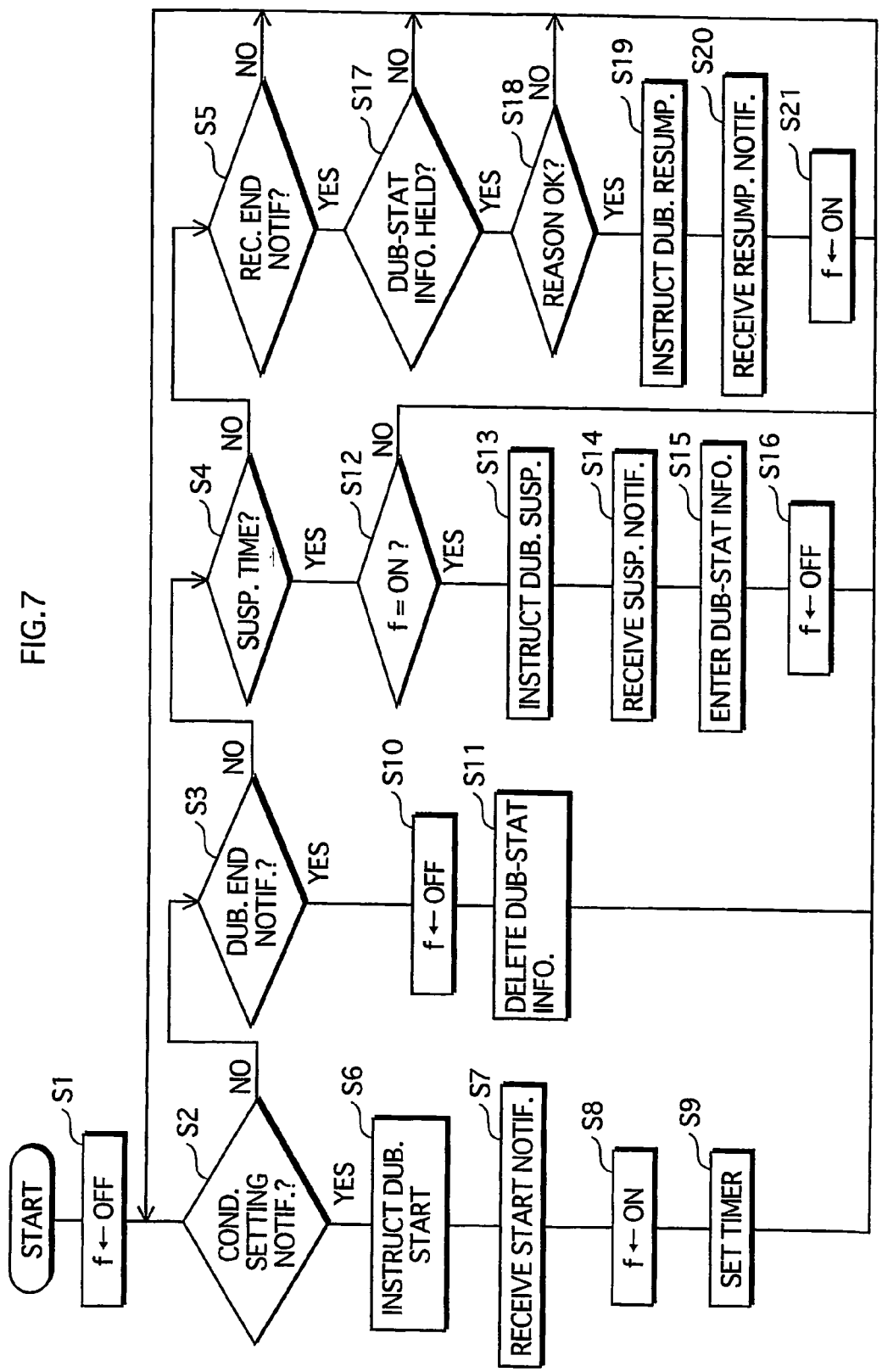
FIG. 7 is a flowchart showing a suspend/resume control procedure.

FIG. 20 differs from FIG. 7 in addition of steps S106, S107, S108 and S109 to the procedure performed when S/R-CTRL unit 13 is notified by dub-CTRL unit 12 that condition information has been entered (S102=YES). Specifically, unit 13 calculates, at step S106, the recording capacity required for the duplicate content based on both the source content set in the condition information and the set dubbing quality, and judges, at step S107, whether a contiguous recording area equal to the calculated capacity exists in the free-space area of DVD 103. If such a contiguous recording area does not exist (S107=NO), unit 13 OSD displays, at step S108, an error screen to the user and sets noncontiguous areas as the writing destination (i.e. same as in embodiment 1). On the other hand, if such a contiguous recording area does exist (S107=YES), unit 13 secures, at step S109, the contiguous recording area.

As a result of the above operations, it is possible to prevent a plurality of duplicate contents relating to the same source content from being recorded in noncontiguous areas, by securing the recording capacity needed to dub the source content in a contiguous recording area in the dubbing destination (i.e. recording medium) at the start of the dubbing. Since the video streams of the plurality of duplicate contents are recorded in the same array as the source content, the editing of these duplicate contents into a single content (i.e. so as to be the same as the source content) after the end of the dubbing is facilitated. This effect is particularly remarkable when DVD+RW or DVD+R is used as DVD 103, since both of these recording mediums require that content video streams be recorded in contiguous recording areas.

Also, because duplicate contents for playback as a single playback route are recorded in a contiguous recording area, the need for random access is avoided, thus eliminating seek times and enabling cuts in power consumption, as well as improving noise reductions.

Embodiment 4

Although the source content in embodiment 1 is divided into a plurality of duplicate contents as a result of the dubbing being suspended/resumed, a feature of embodiment 4 is the deletion of the video stream recorded up until the suspension of dubbing, and the commencement of dubbing from the head of the source content once the unattended recording has ended.

Figure 21:
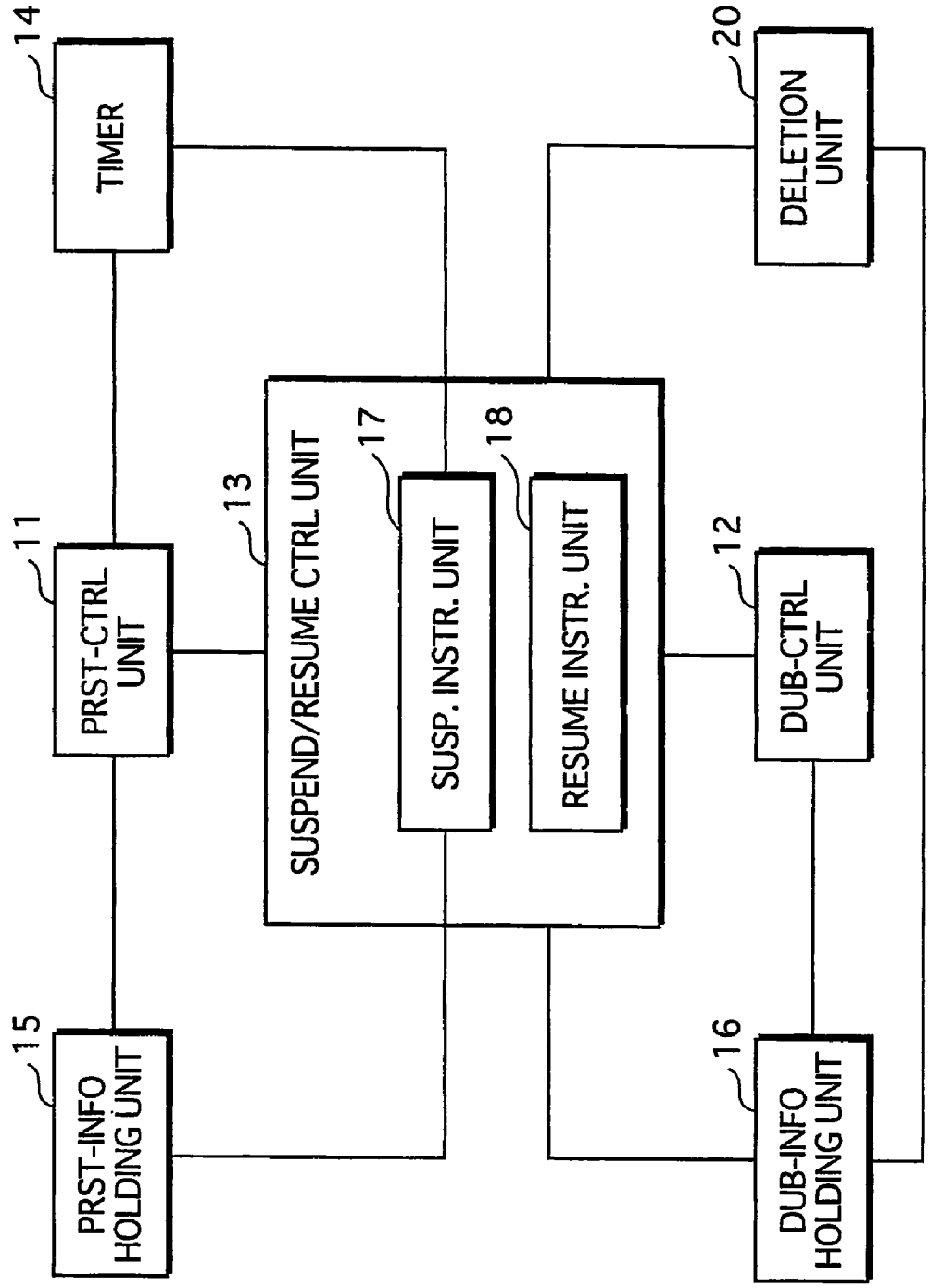
FIG. 21 is a diagram showing a functional structure of a micro computer system 9 pertaining to an embodiment 4.

Firstly, a micro computer system 9 that deletes the duplicate content recorded up until the suspension of dubbing is described. FIG. 21 is a diagram showing the functional structure of micro computer system 9 according to embodiment 4. FIG. 21 differs from FIG. 3 in the inclusion of a deletion unit 20.

Deletion unit 20 controls the deletion of duplicate contents. Deletion controls are performed by acquiring dub-stat information held in dub-info holding unit 16, and deleting the content identified by the duplicate ID in the acquired dub-stat information from DVD drive 7.

Figure 8:
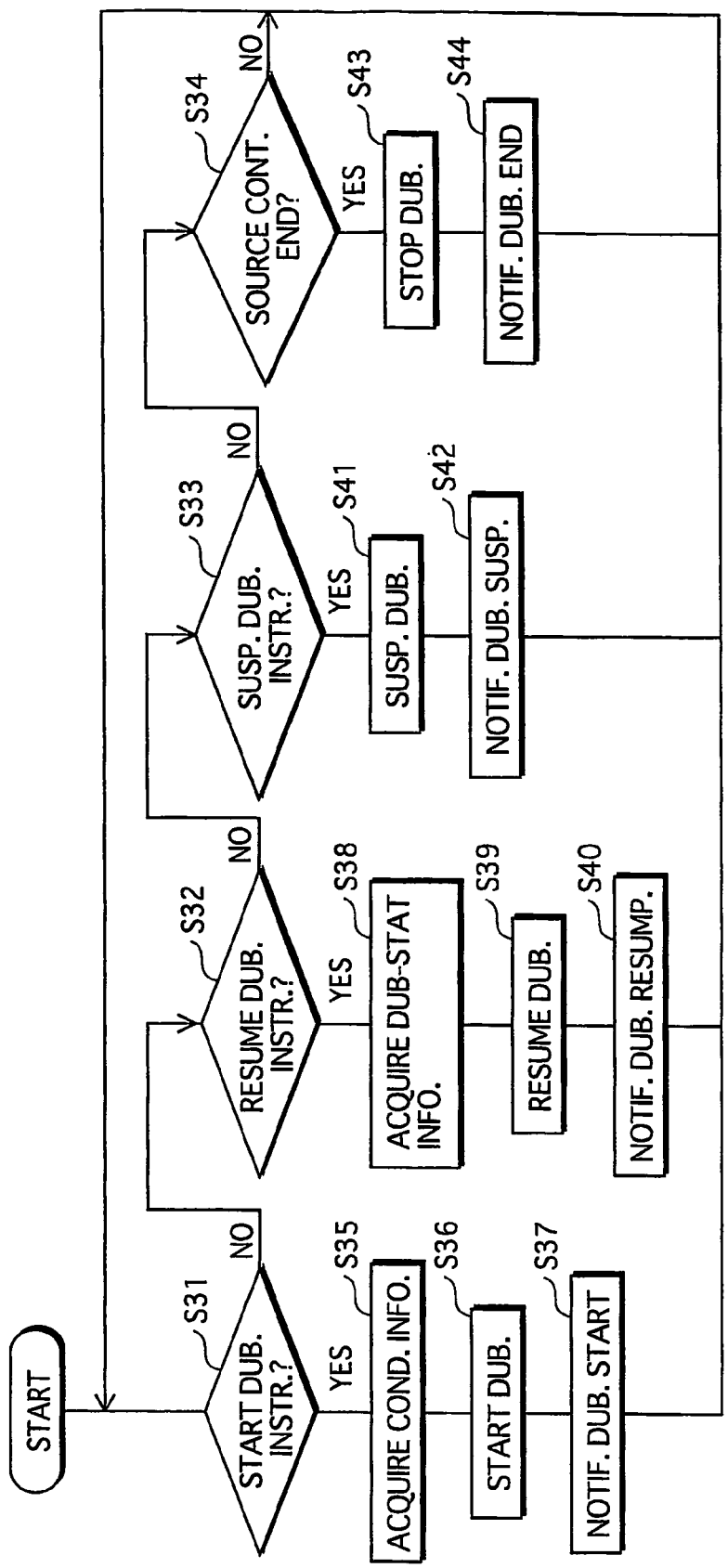
FIG. 8 is a flowchart showing a dubbing procedure.

Also, dub-CTRL unit 12 has HD drive 6 read the source content from the head thereof when the dubbing is resumed at step S39 in FIG. 8.

Figure 22:
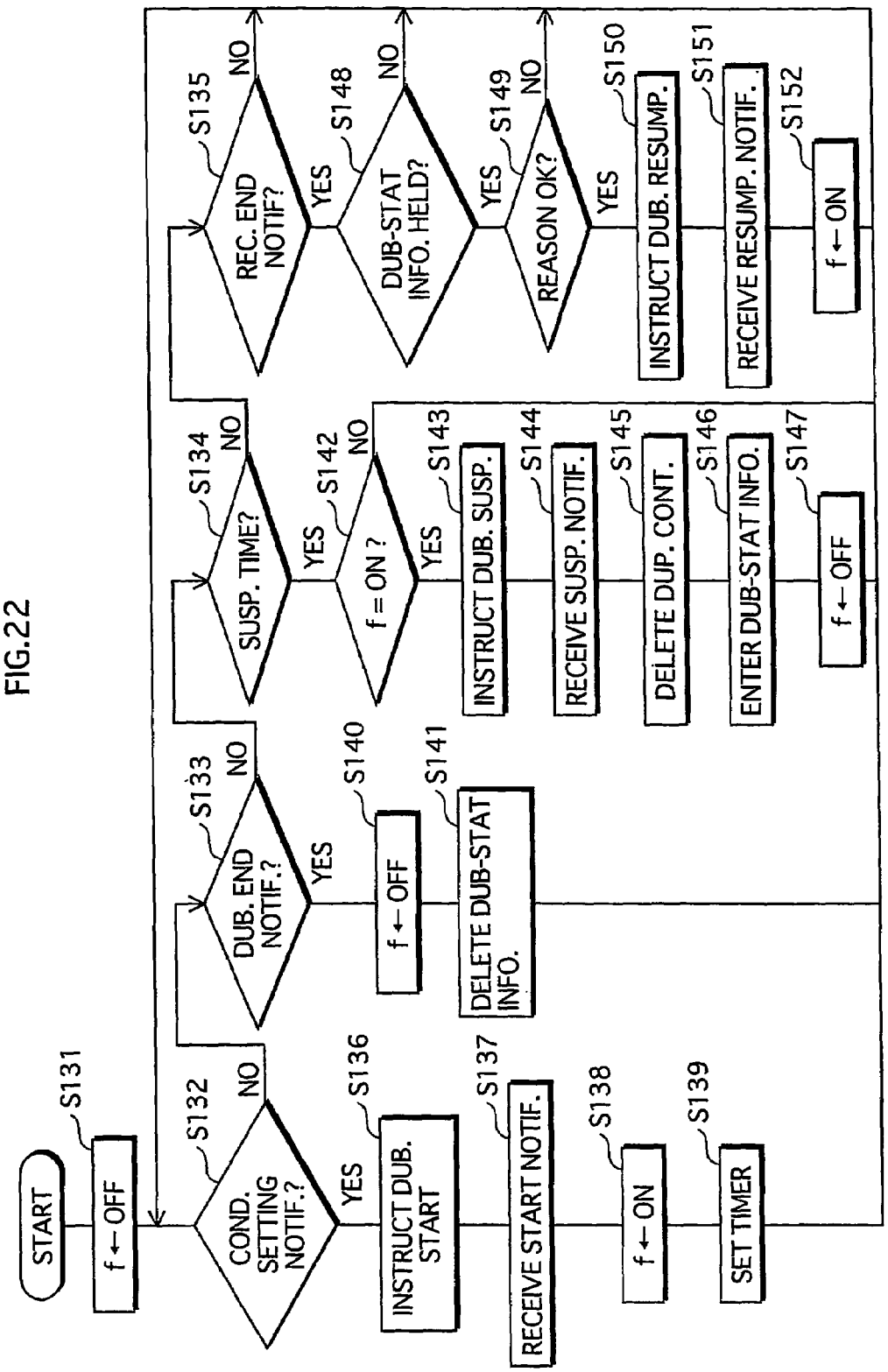
FIG. 22 is a flowchart showing a suspend/resume control procedure pertaining to embodiment 4.
Figure 23A:
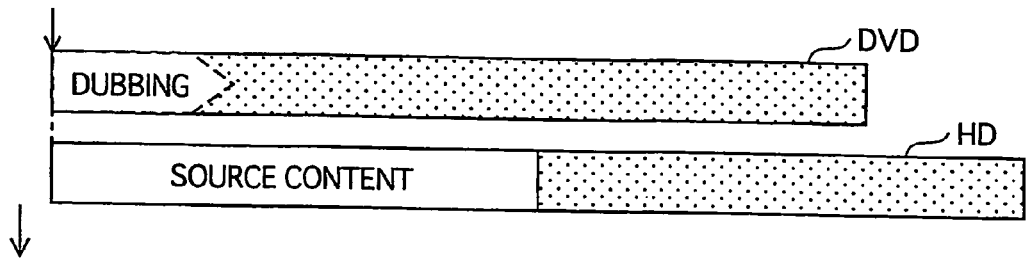
FIGS. 23A-23E are diagrams schematically showing the transition that takes place in recording, according to embodiment 4.
Figure 23B:
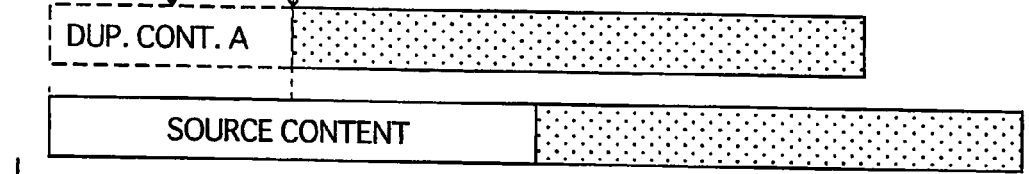
Figure 23C:
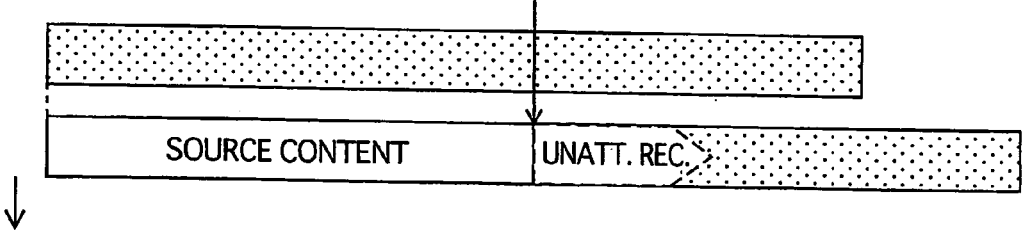
Figure 23D:
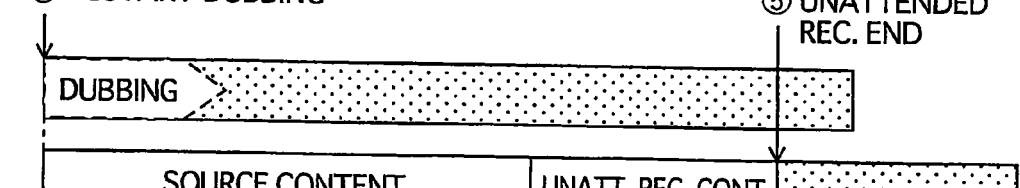
Figure 23E:
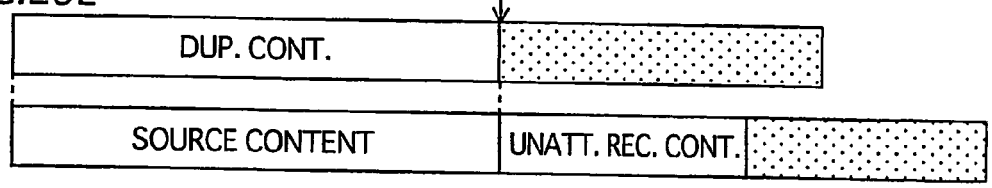
Figure 24A:
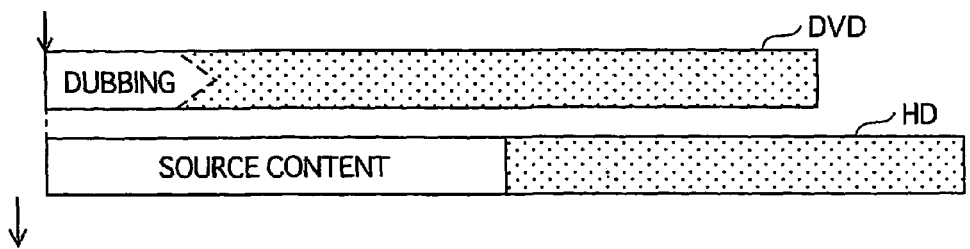
FIGS. 24A-24E are diagrams schematically showing the transition that takes place in recording when the start time of unattended recording to DVD arrives during dubbing from HD to DVD in embodiment 4.
Figure 24B:
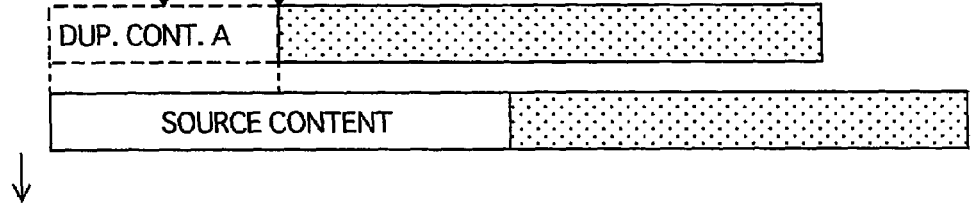
Figure 24C:
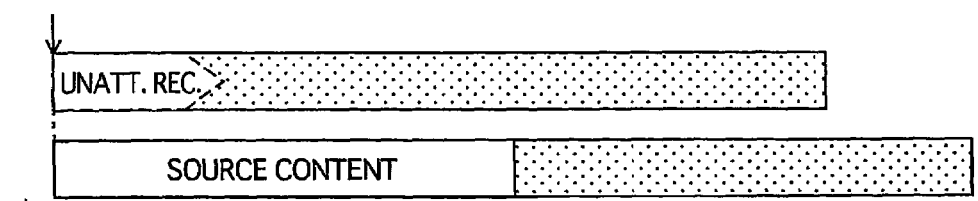
Figure 24D:
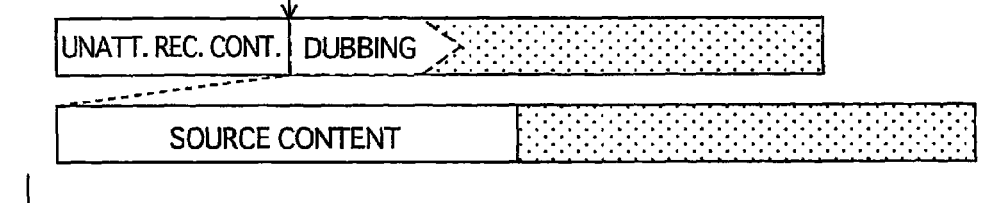
Figure 24E:
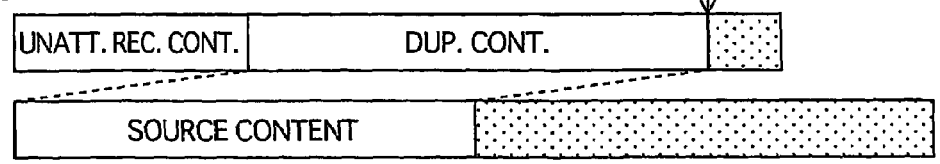
Figure 25A:
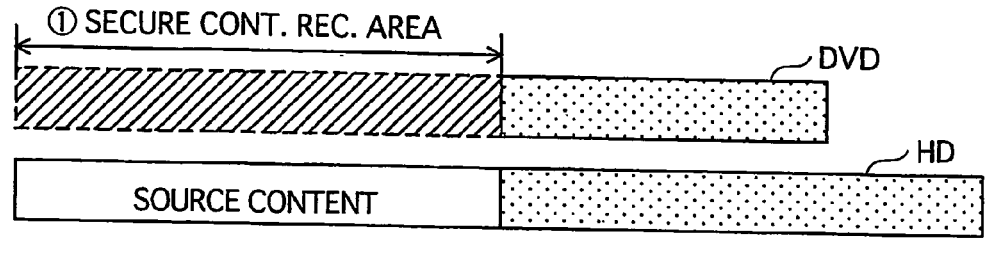
FIGS. 25A-25E are diagrams schematically showing the transition that takes place when a recording area is secured at the start of the dubbing.
Figure 25B:
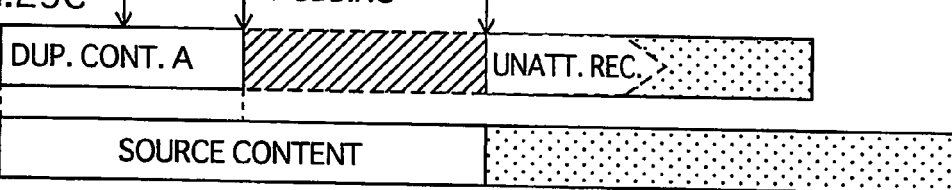
Figure 25C:
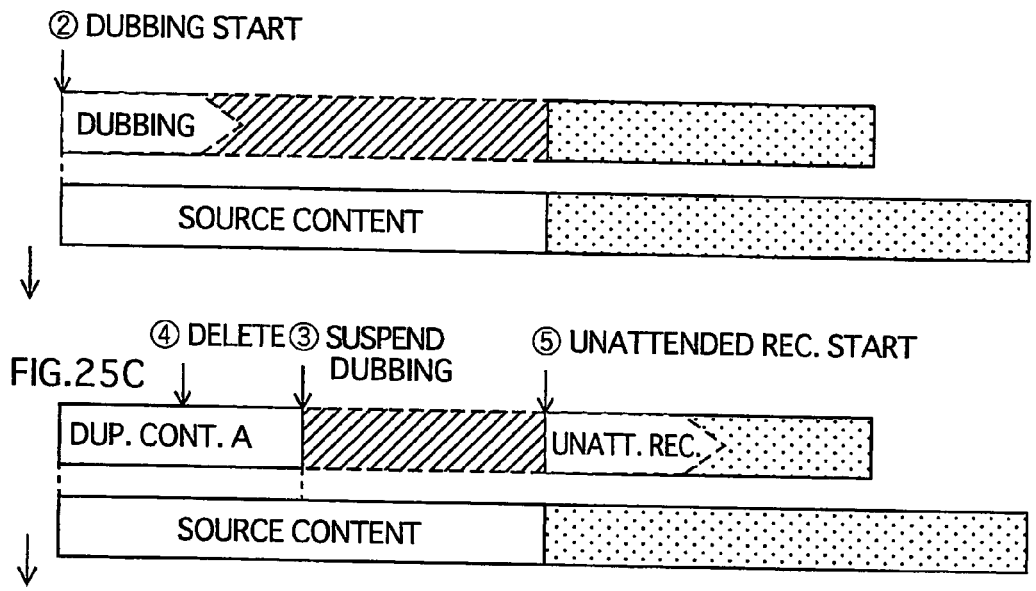
Figure 25D:
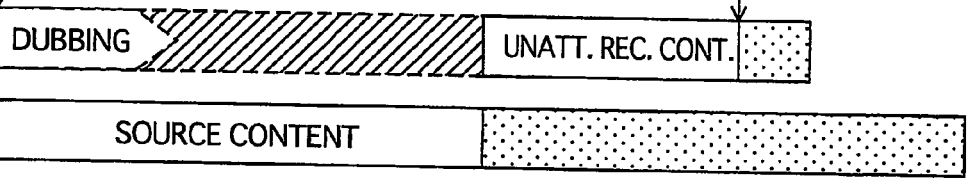
Figure 25E:
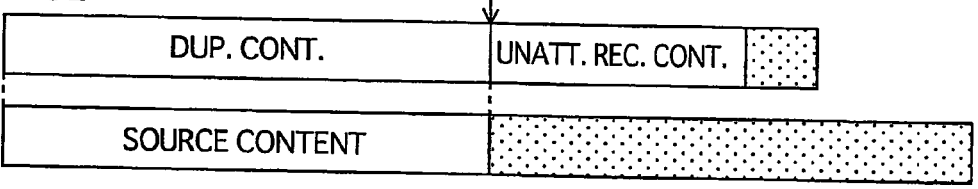

A computer program for realizing the above functional structure is described next. This computer program is created by using a computer language to describe the processing procedure shown in the FIG. 22 flowchart. FIG. 22 is a flowchart showing a suspend/resume control procedure relating to embodiment 4. FIG. 22 differs from FIG. 7 (embodiment 1) in the addition of step S145 to the procedure performed when S/R-CTRL unit 13 is notified by timer 14 that the suspension time as arrived (S134=YES). Specifically, at step S145, unit 13 instructs deletion unit 20 to delete the duplicate content.

According to this processing procedure, dubbing is suspended at the start of the unattended recording and the video stream written up until the suspension is deleted, and then the dubbing is restarted from the head of the source content after the unattended recording has ended, thus prevented the duplicate content from being divided up.

An example of the operations of integrated recorder 100 having the above structure is given below with reference to FIGS. 23A to 23E. FIGS. 23A to 23E are diagrams schematically showing the transition in recording, according to embodiment 4.

Firstly, the dubbing set in the condition information is initiated (1).

When the preset recording time approaches, the dubbing is suspended (2), and duplicate content A written to DVD 103 as a result of the dubbing prior to the suspension is deleted (3).

When the preset recording time arrives, the writing of the preset content is commenced (4).

The unattended recording is ended when the preset end time arrives (5), and the dubbing is resumed from the head of the source content (6).

Once the source content has been dubbed until the end thereof, the dubbing ends (7). Thus completes the description of the operations pertaining to embodiment 4.

According to the present embodiment as described above, it is possible, in addition to successfully recording the preset content, to perform the dubbing without the source content being divided into a plurality of duplicate contents, even when the present recording time arrives during the dubbing.

Note that while the recording destination of the content in the unattended recording according to the present embodiment is set as the HD, the recording destination may be DVD 103. FIGS. 24A to 24E are diagrams schematically showing the transition in recording when the start time of unattended recording to DVD 103 is reached during dubbing from HD to DVD 103.

Furthermore, the recording capacity needed for the dubbing may be secured in a contiguous area of DVD 103 at the start of the dubbing (i.e. same as embodiment 3). FIGS. 25A to 25E are diagrams schematically showing the transition in recording when the required recording capacity is secured at the start of the dubbing, according to the present embodiment.

Also, although in embodiment 1, dub-stat information as shown in FIG. 6A is saved to dub-info holding unit 16 at the time of the dubbing being suspended, there is no need to set the suspension position in dub-stat information according to the present embodiment, since the source content is read from the head thereof when the dubbing is resumed. As such, information in a format that omits the suspension position from the dub-stat information shown in FIG. 6A may be saved to unit 16. This allows for the volume of dub-stat information to be suppressed, and also for the used amount of the recording area to be reduced.

Embodiment 5

A feature of embodiment 5 is that the recording destination of the unattended recording is changed if the recording capacity needed for both the unattended recording and the dubbing exceeds the free capacity of DVD 103.

DVD 103 is capable of recording 6 hours worth of contents at EP quality. Thus, if the 1-hour drama, 30-minute English conversation program, and 2-hour soccer game shown in FIG. 28B are set for dubbing in a state in which the recording of a 2-hour movie to HD and 3 hours of major league baseball to DVD 103 has been preset, as shown in FIG. 28A, there will be insufficient free-space area to record all of the 2-hour baseball game, since the dubbing will take up 4 hours 30 minutes worth of the recording area of DVD 103. As such, in the present embodiment, the recording area required in both the unattended recording and the dubbing is calculated when the dubbing is set via the dubbing setting screen in FIG. 28B, and if the calculated total exceeds the free capacity of DVD 103, the graphical user interface (GUI) screen shown in FIG. 28C is presented to the user, and the recording destination is changed upon the user ratifying the change.

Figure 26:
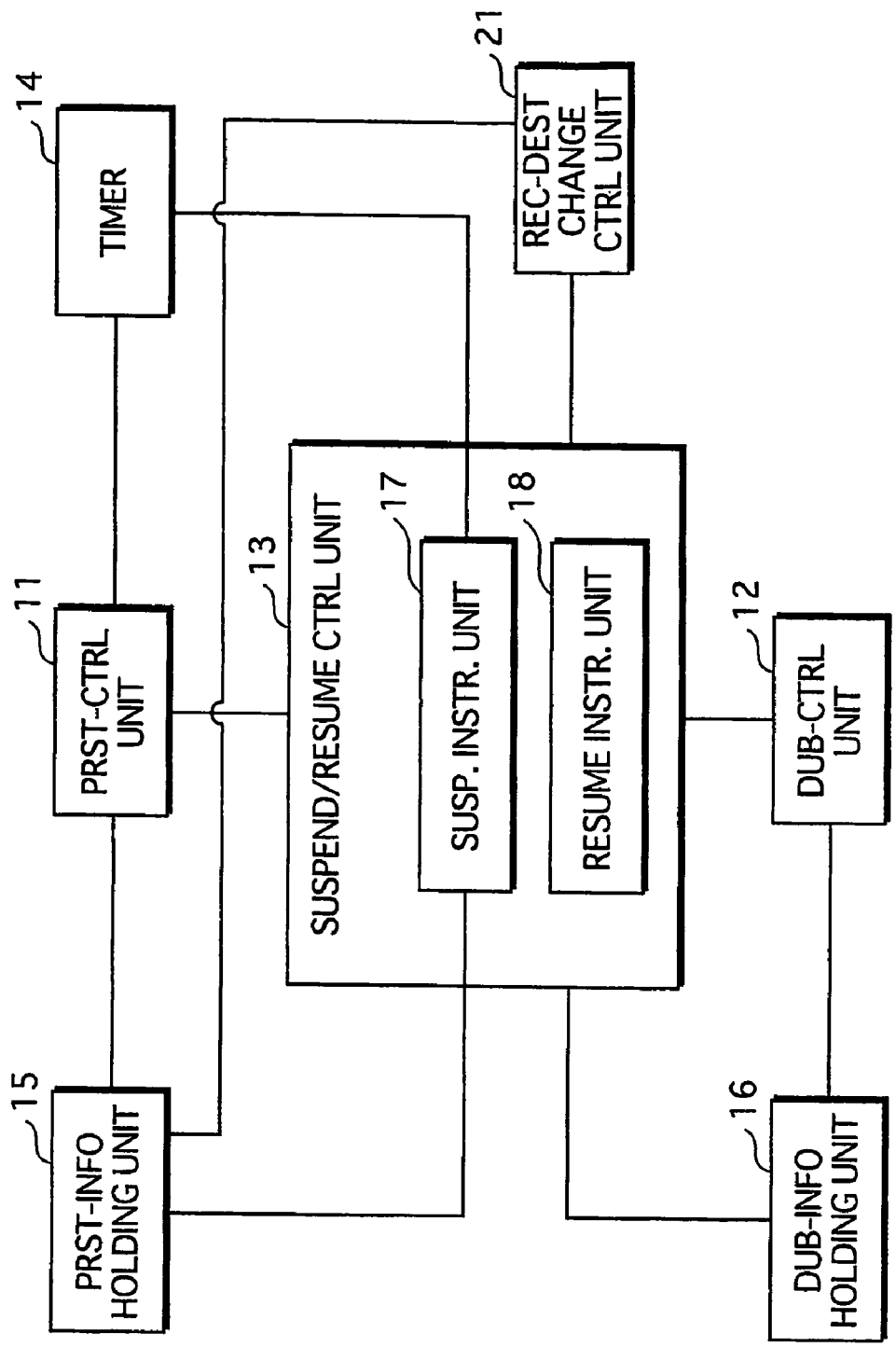
FIG. 26 is a diagram showing a functional structure of a micro computer system 9 pertaining to an embodiment 5.

The following description relates to a micro computer system 9 that realized the above function. FIG. 26 is a diagram showing the functional structure of micro computer system 9 pertaining to embodiment 5. FIG. 26 differs from FIG. 3 in the inclusion of recording-destination change control (rec-dest change CTRL) unit 21.

Rec-dest change CTRL unit 21 controls processing to change the recording destination. These controls are performed by calculating the recording capacity required for the unattended recording based on PRST information held by PRST-info holding unit 15, calculating the recording capacity required for the dubbing based on condition information held by dub-info holding unit 16, judging, based on these calculations, whether the total recording area required for both the unattended recording and the dubbing exceeds the free capacity of DVD 103, controlling the OSD display by OSD generation unit 4 and overlay unit 5 if the free capacity is exceeded, so as to have the GUI screen in FIG. 28C displayed on monitor 102, receiving the user's confirmation of the recording destination change from UOP reception unit 8, and changing the recording destination in the PRST information to the HD.

Figure 27:
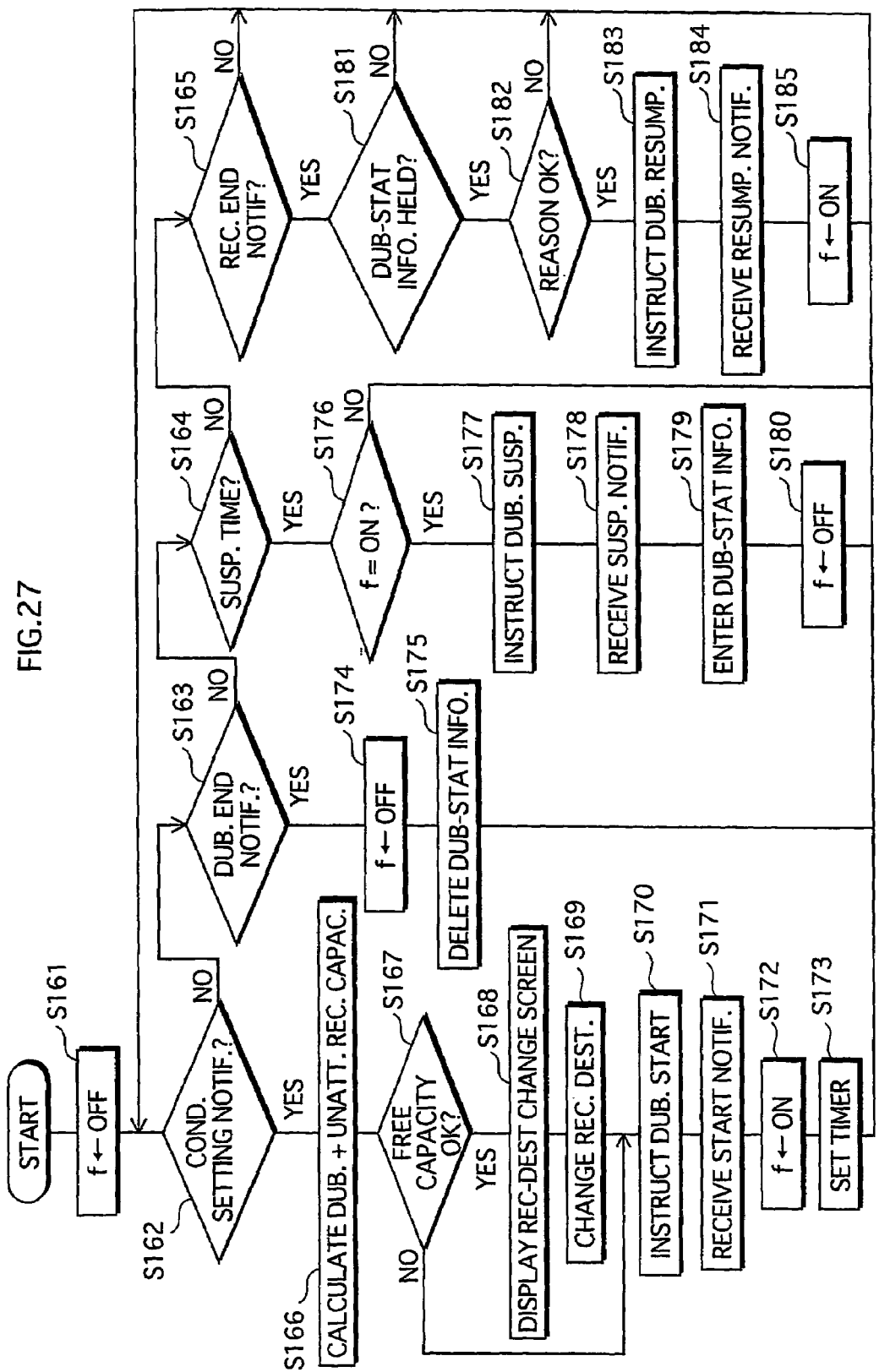
FIG. 27 is a flowchart showing a suspend/resume control procedure pertaining to embodiment 5.
Figure 29A:
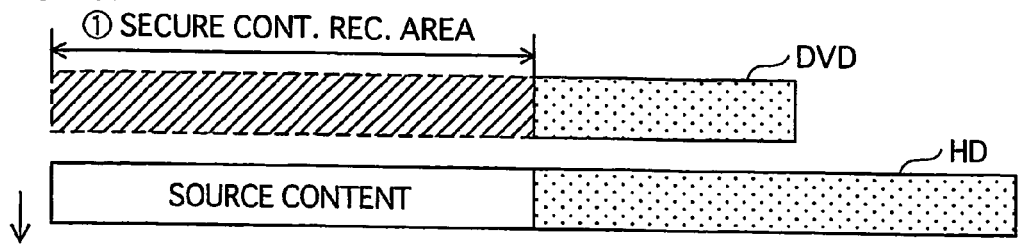
FIGS. 29A-29F are diagrams schematically showing the transition that takes place in recording, according to embodiment 5.
Figure 29B:
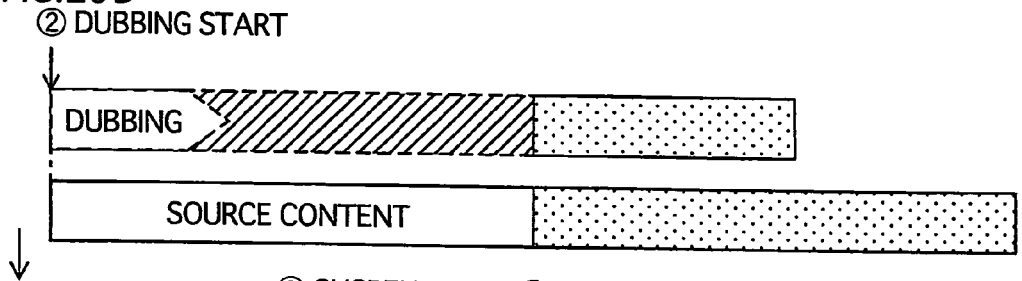
Figure 29C:
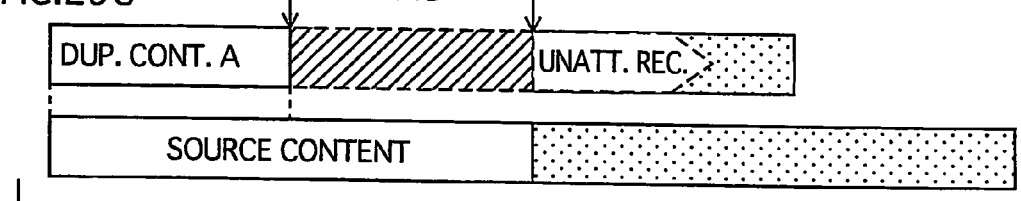
Figure 29D:
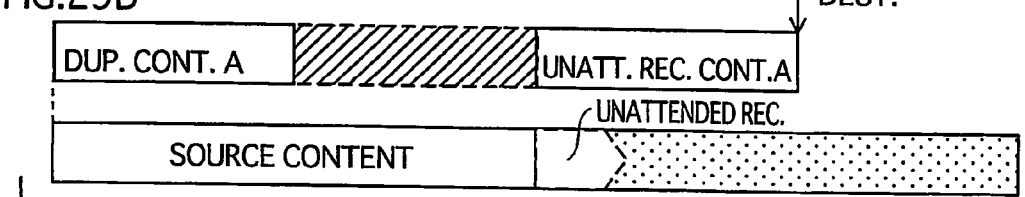
Figure 29E:
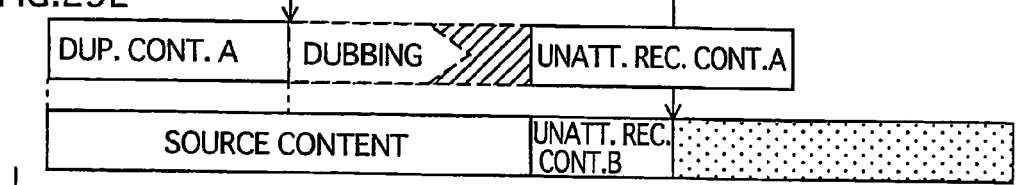
Figure 29F:
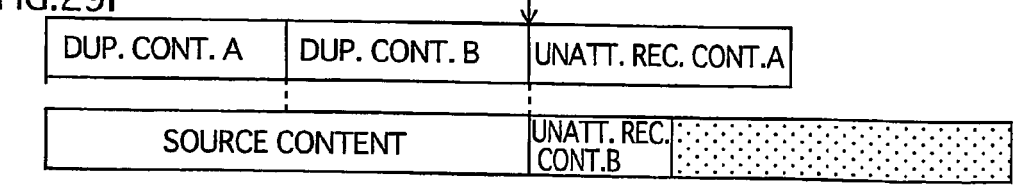

A computer program for realizing the above functional structure is described next. This computer program is created by using a computer language to describe the processing procedure shown in the FIG. 27 flowchart. FIG. 27 is a flowchart showing the processing procedure of the computer program relating to embodiment 5. FIG. 27 differs from FIG. 7 in the addition of steps S166, S167, S168 and S169 to the processing procedure performed when S/R-CTRL unit 13 is notified by dub-CTRL unit 12 that condition information has been set (S162=YES). Specifically, rec-dest change CTRL unit 21 calculates, at step S166, the recording capacity required for both the unattended recording and the dubbing, judges, at step S167, whether the free capacity of DVD 103 is greater than or equal to the calculated recording capacity, confirms the change of recording destination via the GUI screen in FIG. 28C if the free capacity of DVD 103 is less than the required capacity (S167=NO), and changes the recording destination in the PRST information to the HD.

By changing the recording destination using the above procedures, it is possible to prevent the omission of part of a content due to the recording capacity of DVD 103 running out in the middle of the unattended recording or the dubbing.

Note that although the processing to change the recording destination in the present embodiment is executed upon condition information being entered, this processing may be executed at a different point in time if prior to the unattended recording executed when the preset recording time arrives during dubbing. For example, the recording destination may be changed when the dubbing is suspended as the preset recording time draws near. In this case, rec-dest change CTRL unit 21 calculates the recording capacity required for both the unattended recording and the dubbing of the source content from the suspension position, compares the total calculated recording capacity with the free capacity of DVD 103, and changes the recording destination to the HD if there is insufficient free capacity on DVD 103.

Also, as a variation of the present embodiment, the writing destination of the content in the unattended recording may be changed, during the unattended recording, to the HD at the point that the free capacity of DVD 103 is reduced to the recording capacity required in the dubbing of the source content from the suspension position. FIGS. 29A to 29F are diagrams schematically showing the transition in the recording, according to this variation. The operations performed by a recording device pertaining to the present variation are as follows.

Firstly, when condition information is set, a contiguous recording area having the capacity required by the dubbing set in the condition information is secured (1), and then the dubbing of the source content to the secure area is commenced (2).

The dubbing is suspended when the present recording time approached during the dubbing (3), and when the preset time arrived, the writing of the preset content is commenced to a free-space area on DVD 103 other than the secured area (4).

If the free capacity of DVD 103 minus the secured area is filled up during the unattended recording, writing of the content to DVD 103 is stopped, and writing is commenced to the free-space area of the HD (5).

The content writing is ended when the preset end time of the unattended recording arrives (6), and the dubbing of the source content from the suspension point is commenced to the secured area on DVD 103 (7).

The dubbing ends once the source content has been dubbed until the end thereof (8). Thus completes the description of the operations pertaining to the present variation.

Even with a recording device pertaining to the above variation, it is possible to prevent the omission of parts of a content written to a recording medium as the result of unattended recording or dubbing.

Other Variations

The present invention, while having been described above based on the preferred embodiments, is of course not limited to these embodiments. The following variations are also included.

(1) The present invention may be methods for controlling a recording device that are disclosed by the processing procedures in the flowcharts described in the preferred embodiments. The present invention may also be computer programs that realize these methods using a computer, or digital signals formed from these computer programs.

The present invention may also be a machine-readable recording medium that stores the computer programs or digital signals, examples of which include a flexible disk, a hard disk, CD-ROM, MO, DVD, DVD-ROM, DVD-RAM, BD (blu-ray disc), semi-conductor memory, and the like.

The present invention may also be a carrier that transmits the computer programs or digital signals via a network or the like, representative examples of which include a telecommunication circuit, wireless and cable communication circuits, and the Internet.

Also, the computer programs or digital signals may be implemented by another independent computer system, by transferring the computer programs or digital signals to the other computer system, either recorded on the recording medium or via the network or the like.

(2) The present invention can also be implemented as an LSI (large-scale integration) that performs controls on a recording device. This LSI can be realized by integrating the functional blocks relating to the micro computer systems shown in FIGS. 3, 15, 21 and 26 with encoder 2, decoder 3 and OSD generation unit 4, as shown by the broken lines in FIG. 2. These functional blocks and components may be integrated as individual chips or as a single chip that includes part or all of the functional blocks and components.

Here, the LSI given as an example may, depending on the degree of integration, be referred to as an IC (integrated circuit), a system LSI, a super LSI, or an ultra LSI.

Also, the integration method is not limited to large-scale integration, and may be realized by a dedicated circuit or a general-purpose processor. Alternatively, a FPGA (field programmable gate array) programmable after the LSI has been manufactured, a reconfigurable processor capable of reconfiguring the connections and settings of circuit cells within an LSI, or the like, may be employed.

Furthermore, if integration technology that replaces large-scale integration becomes available as a result of advances in semiconductor technology or the advent of derivative technology, the integration of the functional blocks and components may naturally be performed using this technology. The application of biotechnology or the like in this area is also a possibility.

(3) While description in embodiments 1 to 5 relates to the dubbing of contents from HD to DVD, the present invention is also applicable in the case of dubbing from DVD to HD.

(4) While description in embodiments 1 to 5 relates to an integrated recorder 100 that uses HD and DVD as recording media, the recording device pertaining to the present invention is characterized by non-dependency on the physical properties of these recording media, and thus can also be applied to any recording media capable of recording contents. For example, applicable recording media include optical disks such as BD-ROM, CR-R and CD-RW, magneto-optical disks such as PD and MO, semiconductor memories such as SD memory cards, CompactFlash, SmartMedia, Memory Stick, MultiMediaCard and PCM-CIA cards, magnetic recording disks such as flexible disks, SuperDisk, Zip and Clik!, removable hard disks such as ORB, Jaz, SparQ, SyJet, EZFlyer and Microdrive.

Also, while description in embodiments 1 to 5 relates to dubbing between two recording media, the present invention is similarly applicable in the dubbing of contents between three or more recording media.

Also, a combination of recording media are used in embodiments 1 to 5 to record contents encoded by the same method, although as long as the recording media are capable of recording contents, a recording device according to the present invention can also be applied to a combination of recording media that record contents encoded by different methods. For example, if HD and an SD memory card are used as the recording media, a recording device relating to the present invention will be able to dub contents between the HD and the SD memory card by including an SD-Video-compatible encoder and decoder, in addition to the MPEG2-compatible encoder and decoder.

(5) Description in embodiments 1 to 5 relates to recording devices that suspend/resume dubbing following the start/end of unattended recording to record contents whose preset recording time is inputted by a user operation. However, a recording device pertaining to the present invention may apply the recording start/end times of contents specified by another method to dubbing suspend/resume controls. For example, the recording of a content retrieved from an search performed using an EPG (electronic program guide) based on a keyword inputted by a user operation may also be applied to dubbing suspend/resume controls, in the same manner as the unattended recording described in the preferred embodiments.

(6) The present invention may be any combination of preferred embodiments 1 to 5 and the above variations.

INDUSTRIAL APPLICABILITY

The present invention is, as an exemplary utilization, an integrated recorder or the like that has an unattended-recording function and uses HD and DVD-RAM as recording media.

The invention claimed is:

1. A recording device comprising:
a dubbing unit operable to execute dubbing in which a source content is read from a first recording medium and a duplicate of the source content is recorded on a second recording medium;
an unattended-recording unit operable to execute unattended recording in which a content preset for recording is acquired from a broadcast signal and recorded to a designated recording destination, being one of the first and second recording media; and
a control unit operable to cause the dubbing unit to (i) suspend the dubbing prior to the start of the unattended recording if the dubbing is being executed, and (ii) resume the dubbing after the end of the unattended recording if the dubbing has been suspended.

2. The recording device of claim 1 further comprising:
a holding unit operable to hold dubbing information for use in the dubbing resumption, wherein
the control unit includes:
a suspension subunit operable to cause the dubbing suspension and to save dubbing information to the holding unit; and
a resumption subunit operable, if dubbing information is held by the holding unit at the end of the unattended recording, to cause the dubbing resumption based on the dubbing information.

3. The recording device of claim 2, wherein
the dubbing information includes source ID information uniquely identifying the source content, and position information showing the suspension position of the reading, and
the dubbing unit reads the source content identified by the source ID information from the suspension position shown by the position information if the dubbing is resumed.

4. The recording device of claim 3, wherein
the dubbing information further includes reason information showing the reason for the dubbing suspension, and
the resumption subunit resumes the dubbing only if the reason information shows that the dubbing suspension resulted from the start of the unattended recording.

5. The recording device of claim 3 further comprising an editing unit operable to edit a plurality of duplicate contents resulting from the dubbing suspension into a state in which contiguous viewing is possible.

6. The recording device of claim 5, wherein
the dubbing information further includes first duplicate ID information uniquely identifying a first duplicate content recorded prior to the dubbing suspension,
the dubbing unit saves second duplicate ID information uniquely identifying a second duplicate content recorded after the dubbing resumption to the holding unit, and
the editing unit edits the duplicate contents identified by the first and second duplicate ID information into a state in which contiguous viewing is possible.

7. The recording device of claim 6, wherein the editing unit performs the editing by generating playback-route information that defines the contiguous playback of the first and second duplicate contents.

8. The recording device of claim 6, wherein the editing unit performs the editing by generating management information for managing the first and second duplicate contents as a single contiguous content.

9. The recording device of claim 2, wherein the dubbing unit secures, in a recording area of the second recording medium prior to the start of the dubbing, an area having the capacity required in the dubbing, and records the duplicate content in the secured area.

10. The recording device of claim 9, wherein the secured area is a contiguous recording area.

11. The recording device of claim 2 further comprising:
a deletion unit operable, if the dubbing is suspended, to delete the duplicate content recorded prior to the dubbing suspension, wherein
the dubbing unit performs the dubbing from the head of the source content if the dubbing is resumed.

12. The recording device of claim 2, wherein if the second recording medium is designated as the recording destination and has insufficient free capacity, the unattended-recording unit changes the recording destination to the first recording medium.

13. The recording device of claim 12, wherein the unattended-recording unit performs the change in recording destination prior to the start of the unattended recording, if the total capacity required in the dubbing and the unattended recording exceeds the free capacity of the second recording medium.

14. The recording device of claim 12, wherein the unattended-recording unit performs the change in recording destination during the unattended recording, if the free capacity of the second recording medium is less than the capacity required in the dubbing after the dubbing resumption.

15. The recording device of claim 2, wherein the holding unit is a rewritable nonvolatile memory.

16. A method for controlling the execution by a recording device of (i) dubbing in which a source content is read from a first recording medium and a duplicate of the source content is recorded on a second recording medium, and (ii) unattended recording in which a content preset for recording is acquired from a broadcast signal and recorded to one of the first and second recording media, comprising the steps of:
   causing the dubbing to be suspended prior to the start of the unattended recording if the dubbing is being executed; and
   causing the dubbing to be resumed after the end of the unattended recording if the dubbing has been suspended.

17. A computer readable recording medium having recorded thereon a computer program for controlling (i) dubbing in which a source content is read from a first recording medium and a duplicate of the source content is recorded on a second recording medium, and (ii) unattended recording in which a content preset for recording is acquired from a broadcast signal and recorded to one of the first and second recording media, the computer program having a computer execute at least the steps of:
   causing the dubbing to be suspended prior to the start of the unattended recording if the dubbing is being executed; and
   causing the dubbing to be resumed after the end of the unattended recording if the dubbing has been suspended.

18. An integrated circuit included in a recording device, comprising:
   a dubbing unit operable to execute dubbing in which a source content is read from a first recording medium and a duplicate of the source content is recorded on a second recording medium;
   an unattended-recording unit operable to execute unattended recording in which a content preset for recording is acquired from a broadcast signal and recorded to a designated recording destination, being one of the first and second recording media; and
   a control unit operable to cause the dubbing unit to (i) suspend the dubbing prior to the start of the unattended recording if the dubbing is being executed, and (ii) resume the dubbing after the end of the unattended recording if the dubbing has been suspended.

* * * * *